US012535827B2

(12) United States Patent
Bagschik et al.

(10) Patent No.: US 12,535,827 B2
(45) Date of Patent: Jan. 27, 2026

(54) SYSTEMS AND METHODS FOR DETERMINING DRIVING SCENARIO PROBABILITY METRICS AND VEHICLE PERFORMANCE METRICS

(71) Applicant: Zoox, Inc., Foster City, CA (US)

(72) Inventors: Gerrit Bagschik, Lower Saxony (DE); Andrew Scott Crego, Palo Alto, CA (US); Avery Wagner Faller, San Francisco, CA (US); Matthew Ramin Hamedani Heffernan, San Francisco, CA (US); Francis Indaheng, East Palo Alto, CA (US); Andraz Kavalar, San Francisco, CA (US); Aditya Pramod Khadilkar, Foster City, CA (US); Deepan Subrahmanian Palguna, Santa Clara, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/393,564

(22) Filed: Dec. 21, 2023

(65) Prior Publication Data
US 2025/0208620 A1    Jun. 26, 2025

(51) Int. Cl.
  *G05D 1/225*  (2024.01)
(52) U.S. Cl.
  CPC .................................. *G05D 1/225* (2024.01)
(58) Field of Classification Search
  CPC ...................................................... G05D 1/225
  See application file for complete search history.

(56) References Cited

U.S. PATENT DOCUMENTS

| 10,235,886 B1 | 3/2019 | Baughman et al. |
| 10,592,784 B2 | 3/2020 | Zeng et al. |
| 11,086,318 B1 | 8/2021 | Davis et al. |
| 11,150,660 B1 | 10/2021 | Kabirzadeh et al. |

(Continued)

FOREIGN PATENT DOCUMENTS

| CN | 113825689 A | * 12/2021 | ......... B60W 30/182 |
| CN | 115392015 A | 11/2022 | |

OTHER PUBLICATIONS

Non-Final Office Action dated Mar. 27, 2025 for U.S. Appl. No. 18/393,568.

(Continued)

*Primary Examiner* — Michael D Lang
(74) *Attorney, Agent, or Firm* — EIP US LLP

(57) ABSTRACT

Techniques for determining a metrics associated with a vehicle are disclosed. The techniques may comprise receiving a driving simulation scenario associated with a simulated vehicle. Based at least in part on the scenario and a dataset of recorded driving associated with operation of a test vehicle, a plurality of driving events present in the dataset may be determined. Based at least in part on the plurality of driving events, a first metric associated with a likelihood of occurrence of the driving simulation scenario may be determined. A simulation may be instantiated based at least in part on the driving simulation scenario. Based at least in part on the simulation, a safety metric indicative of the safe performance of the simulated vehicle in the simulation may be determined. An aggregate safety metric may be determined based at least in part on the safety metric and the first metric.

19 Claims, 9 Drawing Sheets

(56) References Cited

U.S. PATENT DOCUMENTS

| | | |
|---|---|---|
| 11,702,106 B1 | 7/2023 | Poubel et al. |
| 11,734,473 B2 | 8/2023 | Bagschik et al. |
| 11,741,274 B1 | 8/2023 | Crego et al. |
| 11,960,292 B2 | 4/2024 | Nayhouse et al. |
| 2019/0196465 A1 | 6/2019 | Hummelshøj |
| 2020/0160559 A1 | 5/2020 | Urtasun et al. |
| 2020/0334405 A1 | 10/2020 | Raichelgauz et al. |
| 2021/0097148 A1 | 4/2021 | Bagschik et al. |
| 2021/0133500 A1 | 5/2021 | Faller |
| 2021/0276587 A1 | 9/2021 | Urtasun et al. |
| 2021/0347372 A1 | 11/2021 | Bagschik et al. |
| 2021/0370972 A1 | 12/2021 | Bagschik et al. |
| 2021/0406560 A1 | 12/2021 | Park et al. |
| 2022/0108049 A1 | 4/2022 | Letwin et al. |
| 2022/0126863 A1 | 4/2022 | Moustafa et al. |
| 2022/0197280 A1 | 6/2022 | Venkatadri et al. |
| 2023/0036840 A1 | 2/2023 | Geraldy et al. |
| 2023/0252084 A1 | 8/2023 | Kabzan et al. |

OTHER PUBLICATIONS

International Search Report and Written Opinion dated Apr. 11, 2025 for PCT Application No. PCT/US2024/059812.
United States Notice of Allowance dated Oct. 21, 2025 for U.S. Appl. No. 18/393,553.

* cited by examiner

SYSTEMS AND METHODS FOR DETERMINING DRIVING SCENARIO PROBABILITY METRICS AND VEHICLE PERFORMANCE METRICS

BACKGROUND

Planning systems in autonomous and semi-autonomous vehicles may determine actions for a vehicle to take to navigate through an environment. It may be important to test the performance of such planning systems, in particular with regards to safety, before deployment of the vehicles onto public roads.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
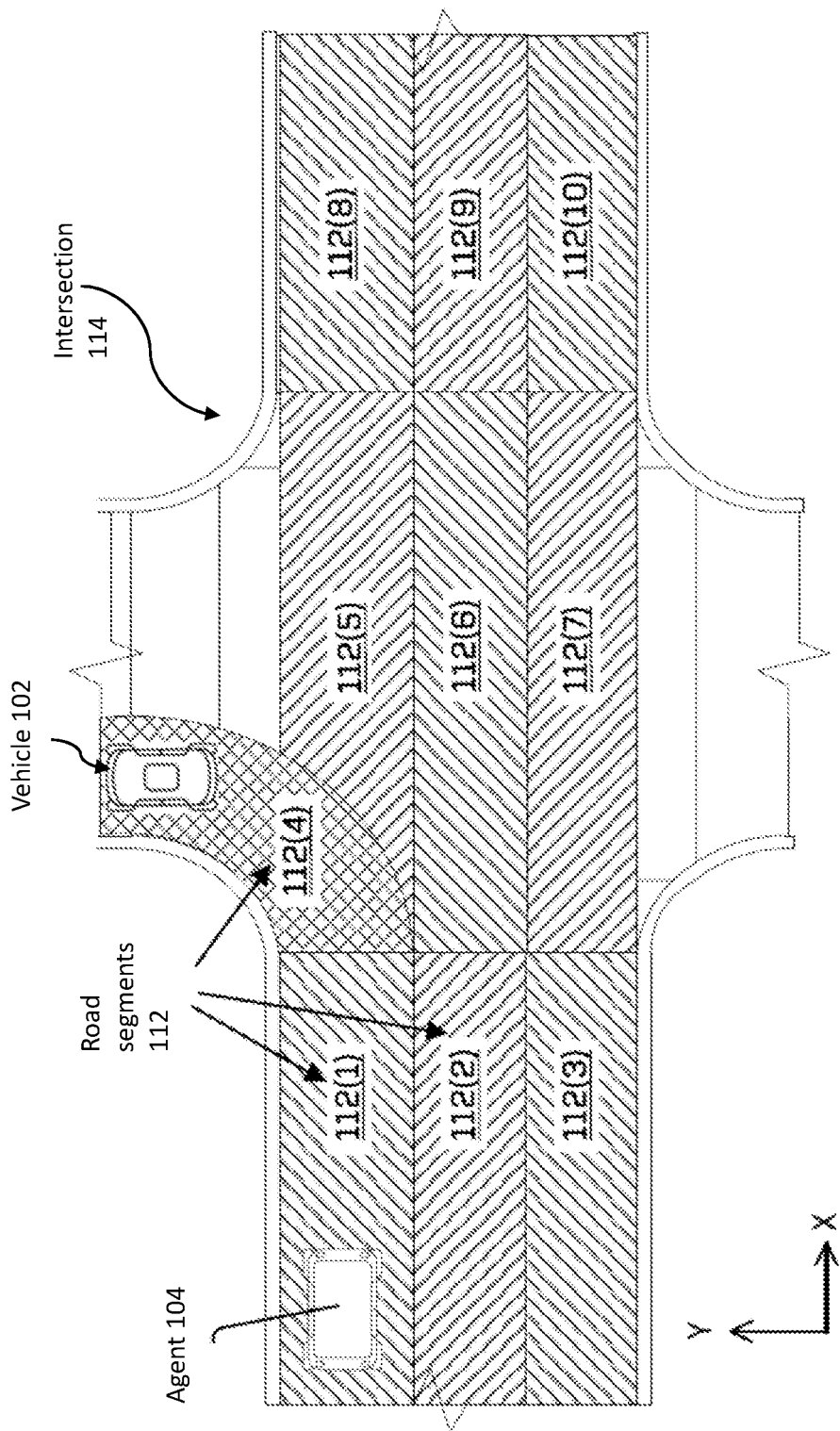
FIG. 1 illustrates example map data comprising road segments.

Planning systems for autonomous and semi-autonomous vehicles may be tested by simulating their response to scenarios in driving simulations. A driving simulation may provide inputs representing real-world inputs to one or more simulated control components of a vehicle (e.g., a simulated perception component, simulated prediction component, and/or simulated planning component). The operation of the simulated control components in responding to such simulated inputs may then be monitored, and metrics may be derived representing the performance of the vehicle. In various examples, such inputs may be to a vehicle operating in an environment, a physical model of the vehicle (e.g., as may be attached to a dynamometer), and/or a fully simulated environment though, for ease of description, the disclosure will describe those instances in which the environment is simulated without limitation. Such metrics may take into account both the performance and how likely a particular scenario is to occur. Both the data used to create the simulation and the data used to determine a metric associated with likelihood of a scenario may be based on log data, e.g., data recorded by vehicles traversing a real-world environment including, but not limited to, sensor data, outputs of various systems and subsystems, messages therebetween, control messages, and the like. On the one hand, performance metrics may be improved by using up-to-date log data and/or up-to-date map data representing driving environments. On the other hand, determining data for simulation scenarios and the likelihood of particular scenario may be a time-consuming and resource-intensive process, and often may involve significant user input. As a result, scenario data and/or probability metrics may be updated only infrequently, reducing their accuracy as map data and vehicle control systems change.

Techniques of the present disclosure may enable metrics associated with likelihood of scenarios and data for simulating scenarios to be dynamically and automatically generated while preserving the ability to accurately measure characteristics such as improvements in safety and general operating behavior regardless of scenarios used. Such techniques may allow vehicle performance metrics, such as safety metrics, to be regularly refreshed using up-to-date data. Furthermore, such techniques enable immense scaling of such computations for ensuring safety over large areas while reducing required computational resources. In particular, such techniques may allow the metrics to be determined dynamically, as vehicle operations are expanded into new areas, while providing improved safety insights about those new areas of operation.

As will be discussed in detail herein, various regions may be selected for testing to ensure autonomous operation is sufficiently safe (according to metrics) when operating in such regions prior to operating an autonomous fleet of vehicles in those regions. In general, to do so, not only does the operation of the software on each portion of the environment (e.g., lane segment) need to be tested, but so do all various scenarios which may be encountered. However, not all portions of the environment will be equally driven on during real-world operation, nor are all scenarios equally represented in real-world observations. As such, the techniques described herein may also ensure that safety tests and metrics are performed and calculated with the relative probabilities of observing such an event (e.g., an exposure), as well as given the likelihood on driving on a particular portion.

Some techniques of the present disclosure may provide or otherwise determine dynamically generated metrics representing a likelihood of a particular driving scenario occurring in the real world. For example, some techniques may comprise receiving a driving simulation scenario which may have a scenario type and/or may specify any one or more of: a maneuver for a simulated vehicle to perform, a position of a simulated agent proximate the simulated vehicle, the position of the simulated vehicle and/or other objects relative to a road context, and/or a road context (which is further defined below but may be, e.g., within in intersection and/or type of intersection (4-way, 3-way, 5-way, roundabout, etc.), along a portion of lane without an intersection, etc.), generating a database query based at least in part on the driving simulation scenario, retrieving from a database, based at least in part on the database query, a plurality of driving events associated with the scenario type, the database comprising abstracted log data (e.g., recorded messages comprising sensor data, outputs of systems or subsystems as described herein, outputs to controllers, any messages generated and passed therebetween, or otherwise) representing observed vehicle and agent maneuvers associated with driving log data. As used herein, a driving event may comprise a sequence of log data representing a situation experienced by the recording vehicle as it traverses an environment. The techniques may comprise determining, based at least in part on the plurality of driving events, a metric associated a likelihood of occurrence of a driving simulation scenario. As a non-limiting example of which, the metric may be determined as a relative percentage of statistically similar observations to the scenario type (e.g., based on driving events that have been identified based at least in part on a similarity between a respective driving event and the driving simulation scenario). That is, despite differences in states (e.g., positions, velocities, accelerations, headings, etc.), the observed data generally align with defined the scenario type. As a non-limiting example, a scenario type associated with a vehicle approaching a 4-way intersection with another object may be the designated as a matching scenario despite log data indicating differing combinations of positions (e.g., entering from the North, South, East, or West), differing relative stopping positions to the intersection, object types (e.g., car, truck, motorcycle, bicycle, etc.), or otherwise so long as the log data matches two objects entering a 4-way intersection. As such, the ability for the software to safely respond to rare scenarios may be tested but discounted for determining whether the vehicle is able to operate safely in the aggregate over realistic events.

Furthermore, such a metric may be altered based on one or more modifications to the scenario type. As a non-limiting example, if a scenario type is defined as the vehicle and a car entering a 4-way intersection is determined to have a metric of 0.5, scenario types which replace the car with a truck, bicycle, motorcycle, etc. may scale the metric by multiplying it by a scalar. As such, various other scenarios may be accurately accounted for without needing to rerun a simulation multiple times, thereby conserving computational resources and making the operations more efficient while preserving the safety of the system.

Some techniques may comprise instantiating a driving simulation based at least in part on the driving simulation scenario. A safety metric indicative of the safe performance of the simulated vehicle may be determined based at least in part on the simulation. A safety metric may be determined based at least in part on the simulation. The safety metric may further be determined based at least in part on the metric indicative of likelihood of occurrence of the simulated driving simulation. Thus, as noted above, if a scenario is determined to be relatively rare, results of a simulation run based on said simulation may be relatively down-weighted compared to other scenarios. As used herein, a road context may represent or otherwise be associated with a road network, or portion thereof, in the simulated environment in which the simulated vehicle operates according to the driving scenario. For example, road context may comprise one or more roads or road segments, a road layout, road features (e.g., crosswalks, intersections, number of lanes, etc.). Simulated agents, e.g., simulated vehicles or objects in the simulated environment other than the primary simulated vehicle, may be associated with a position in the road context. In general, the road context may represent an abstracted version of map data, as opposed to specifying specific roads and specific locations in map data. In a non-limiting example, instead of specifying 'First Street', road context may define abstracted features such a road having a particular number of lanes. The abstracted features may be used to identify multiple roads (in this example) in map data that have the specified features, which may include 'First Street' as well as other streets.

A scenario type may represent a class of driving events that may occur in driving simulations. In non-limiting examples, a scenario type may be 'continuous driving on a straight road'; 'turning left', or 'passenger pick up or drop off'. The scenario type may be determined based on the simulated vehicle alone, i.e., without any consideration of agents defined in the simulation scenario. For example, as mentioned above, the scenario type may be determined based at least in part on a simulated vehicle maneuver.

Accordingly, techniques of the present invention may dynamically determine metrics based at least in part on abstracted representations of the simulated vehicle and the map data. Abstracted representations of log data may be queried based on the abstracted vehicle and map data requirements, yielding a plurality of recorded driving events which may for example have occurred on similar roads to the driving scenario, and with the recording vehicle performing similar operations to that defined in the driving scenario. The likelihood of occurrence of particular driving events, or of parameters associated with driving events (e.g., speed of approach of another vehicle to the primary vehicle) may be statistically determined based on the retrieved driving events. Thus, a metric for a given driving scenario may be automatically determined, without requiring manual input or mining of raw data logs. If a scenario is updated (e.g., a parameter associated with the scenario is changed), a revised metric for the scenario may be determined. Furthermore, if a scenario is created that has not occurred in real-world driving logs, the abstracted representations may yield sufficiently similar driving events to determine a likelihood of the created scenario occurring.

In some examples, the scenario type of a driving simulation scenario may be determined based at least in part on a predetermined association between vehicle maneuvers and scenario types. For example, a table or database may store scenario types and the vehicle maneuvers they are associated with. When a metric is determined for a new scenario, the scenario type may be looked up, rather than being determined ab initio. Pre-computing such associations may reduce compute time and costs, since the associations may otherwise be recalculated multiple times. Some examples may use the scenario type of a driving simulation scenario to determine an initial set of driving events associated with that scenario type (e.g., use scenario type as an index for driving events).

Some examples may comprise determining a similarity metric between a given driving event and the driving simulation scenario. The similarity metric may for example be based on one or more of: road context, agent information, and/or a vehicle maneuver (which collectively may be considered abstracted information relating to the driving simulation scenario). In some examples, a particular driving event may be included in the plurality of driving events based at least in part on its similarity metric meeting or exceeding a similarity threshold.

Some examples may comprise identifying the plurality of driving events in a driving event database, the driving event database comprising abstracted representations of log data received from vehicles, the abstracted representations comprising vehicle maneuvers over periods of time. As discussed above, such examples may avoid the need to search through raw log data (e.g., log data as recorded by a vehicle, specifying specific vehicle positions and other parameters at specific time instances). Instead, the abstracted data may provide a higher-level view of the vehicle and its environment. As well as making searching for relevant driving events more efficient than searching raw log data, such abstraction may allow sufficiently similar driving events to be found for scenarios that have not been recorded in the real world, allowing metrics associated with likelihood of occurrence to be derived for such scenarios. For example, driving events with agents at similar positions around the primary vehicle (e.g., within a predetermined distance of the equivalent agent position(s) in the driving simulation scenario) may be retrieved, and used to determine metrics.

Some examples may comprise retrieving log data based at least in part on the plurality of driving events and determining the metric based at least in part on the log data. Thus, the metric may be determined using specific raw log data, providing detailed information on which to determine a metric, while still allowing the search for driving events to be performed efficiently using abstracted representations. For example, identifiers of the driving events may be retrieved from the database of abstracted log data, and the raw log data may be retrieved from a raw log database based on the identifiers.

In some examples, the simulated agent information may be associated with a road context. For example, simulated agent position(s) may be defined in relation to the road context. In a non-limiting example, a simulated agent position may be a distance x from an intersection having at least y exits. The method may comprise identifying the plurality of driving events based at least in part on the road context. As discussed above, using road context may provide a further level of abstraction compared to specifying individual roads or locations.

Some examples may comprise determining one or more statistical models representing parameters associated with the plurality of driving events. For example, one or more mixture models, such as Gaussian mixture models, may be determined. A model may be determined for each of a plurality of parameters associated with the driving scenario, by building statistical representations of the associated parameters as experienced in the driving event. In a non-limiting example, a driving scenario may comprise the simulated vehicle entering a road from a driveway. A parameter may be a speed of an approaching vehicle. The driving events retrieved may be comprise events where the primary vehicle entered a road from a driveway with an approaching vehicle. A distribution of the approach speeds of the approaching vehicle in the driving events may be determined. The distribution may be used to determine a probability of an approaching vehicle having a given speed. Such a probability may be combined with probabilities associated with other parameters of the driving scenario to determine a combined probability metric associated with the driving scenario. In some examples, one or more parameters of the driving simulation may be determined based at least in part on the statistical model(s). For example, parameters that are likely to occur may be selected. Techniques for deriving probability metrics based on simulations are discussed in more detail in US20210347372, which is incorporated herein by reference in its entirety for all purpose.

Additional techniques of the present disclosure may provide for the dynamic selection of roads or road segments to include in a driving simulation. For example, a driving simulation scenario may specify or otherwise be associated with a target road context or target road feature. Techniques may automatically determine matching roads or road segments in map data. Thus, driving simulation scenarios may describe roads in an abstract manner, and actual roads in map data may be automatically identified. As a non-limiting example of which, a scenario type may simply define a scenario in which a vehicle and an object enter an intersection. In response, all potential intersections within a defined region may be returned in which the vehicle and the object are capable of entering into an intersection (which may include, for example, 3-, 4-, 5-way intersections, roundabouts, etc.) unless more details about the scenario are specified. In general, the determination may identify road segments for incorporation into a simulation in which a specified action is capable of being performed. This may allow the same scenario simulation to be applied to multiple different map regions, without having to manually specify the specific desired roads in the map region for the simulation. Further, as map data and/or road segment identifiers in map data is liable to change, for example as more data is recorded from the real-world environment represented in the map data, as regions for testing change, or as roads are updated in the real world, such techniques may allow new road segments to be automatically determined for a simulation scenario, without users having to specify individual roads to use.

Accordingly, techniques of the present disclosure may comprise receiving a driving simulation scenario associated with simulating a vehicle. In some examples the driving simulation scenario may specify a target road feature (or generally a target scenario) associated with simulated operation of the vehicle. The techniques may comprise receiving map data comprising a first road segment associated with a first road feature and a second road segment associated with a second road feature; determining, based at least in part on the map data and the driving simulation scenario, a dataset of road segments comprising the first road segment; initiating a first simulation of the vehicle in accordance with the driving simulation scenario, the first simulation including the first road segment; determining, based at least in part on the first simulation, a metric indicative of performance of the vehicle. Techniques may comprise transmitting, based at least in part on the metric, a signal to a vehicle in a fleet of vehicles to drive autonomously within a real-world environment. For example, the signal may instruct the vehicle to drive in or not drive in a particular geographical area, and/or to enable or disable a feature of the vehicle (e.g., a particular vehicle maneuver).

In some examples, the first road segment may be included in the dataset based at least in part on the driving simulation scenario being capable of being performed on, in, near, or in association with the first road segment. For example, the driving simulation scenario may comprise a first vehicle maneuver or generally a first vehicle operation. The first road segment may be a road segment on which the first vehicle maneuver/operation can be performed. In a non-limiting example, the first vehicle maneuver may be a left turn at an intersection; the first road segment may be or comprise an intersection where a left turn is possible. In general, determining the dataset of road segments may comprise determining a set of road segments within the map data in which the driving simulation scenario is capable of being performed.

In some examples, the driving simulation scenario may specify a target road feature (e.g., objects or road layouts). The first road segment may be included in the dataset based at least in part on a similarity between the target road feature and the first road feature associated with the first road segment. In other words, in such examples the driving simulation scenario may be able to be performed on the first road segment because the first road segment comprises or is otherwise associated with the target feature. For example, a similarity metric may be determined representing a similarity between the first road segment and the target road segment. If the similarity metric exceeds a similarity threshold, the first road segment may be included in the dataset.

In some examples, the second road segment may also be included in the dataset. A second simulation including the second road segment may be initiated, and the metric may be determined based at least in part on the first simulation and the second simulation. In other examples, the second road segment may be omitted from the dataset. For example, the second road segment may not match a target road feature associated with the driving scenario, or may not be capable of supporting the driving simulation scenario (e.g., it may not be possible to perform a maneuver associated with the driving simulation scenario on the second road segment).

Generally, each road segment may represent different areas in an environment, and accordingly may have unique properties or attributes. By way of nonlimiting example, each road segment may have or be associated with properties or features identifying one or more of: geometry information (e.g., width, length, curvature, or other extents), roadway grade, a number of lanes, lane type(s), lane direction of travel, traffic rules (e.g., speed limit, right-of-way, etc.), traffic signs (e.g., lights, signs, etc.), road segment connection information (e.g., connection rules between two road more road segments), road markings (lane markers, crosswalks, etc.), and the like. Thus, road segments can vary in size and shape, lanes, and/or other information. In some examples, a road segment can include a parking lane, crosswalk, no parking zone, median or other physical barrier, bridge, tunnel, sidewalk, speed bump, bicycle lane, or other properties. Any such property, or combination of such properties, may be a target road feature.

Some examples may comprise receiving a second driving simulation scenario specifying the target road feature; creating a second dataset of road segments based at least in part on the first dataset; and initiating a further simulation of the vehicle in accordance with the second driving simulation scenario, the further simulation of the vehicle including at least one road segment from the second dataset. For example, a second driving simulation scenario may require the same or similar road features to the first driving simulation scenario. Instead of re-querying the map data, techniques may re-use the already identified dataset of road segments. Such examples may reduce the time and computer resources required for generating road segments for a set of simulation scenarios. In some examples, where the determined dataset comprises a plurality of road sections, a first subset of road sections may be selected for the first scenario, and a different, second subset of road sections may be selected for the second scenario. Such examples may be used, for example, to provide a greater variety of roads simulated in set of driving simulations.

In some examples, the dataset may comprise a third road segment (for example determined similarly to the first and second road segments as above). The techniques may comprise creating a reduced dataset including the first road segment and the second road segment and precluding the third road segment. The first simulation and the second simulation may be initiated based at least in part on the reduced dataset. In other words, simulations may be run for fewer road segments than are identified from the querying the map data for road segments having the target road feature(s). In particular, the third road segment may be excluded from the reduced dataset based at least in part on a similarity to the first or second road segments. Where scenarios are very similar, there may be limited benefit to simulating each road individually, as behavior of the vehicle control systems may be expected to be similar in both cases. Running a simulation may be computationally intensive, and so reducing the number of road segments for which simulations are run may reduce the computational burden and time required to simulate scenarios without loss of road segment feature coverage. Determining a reduced set of road segments is discussed in more detail in U.S. application Ser. No. 18/225,658, filed Jul. 24, 2023, which is incorporated herein by reference in its entirety for all purposes.

Techniques may comprise receiving a driving simulation scenario associated simulating a vehicle in an environment (which may be associated with a target road feature); determining, based at least in part on map data and on the driving simulation scenario, a first road segment of the map data. The first road segment may be associated with a first road feature. Some techniques may comprise identifying the first road segment based at least in part on an association between the first road feature and the target road feature. The techniques may comprise initiating a simulation of the vehicle in accordance with the driving simulation scenario the simulation including the first road segment; determining, based at least in part on the simulation, a safety metric associated with autonomous operation of the simulated vehicle in a region comprising the road segment; and transmitting a signal to a vehicle of a fleet of vehicles in a real-world environment to one or more of drive or refrain from driving in the region based at least in part on the safety metric.

In some examples, determining the first road segment may comprise one or more of: (i) a maneuver defined by the driving simulation scenario being able to be performed on the first road segment; (ii) the first road feature matching the target road feature; (iii) the first road feature comprising the target road feature; (iv) the first road feature including part of the target road feature; or (v) the first road feature having or being associated with a parameter within a predetermined threshold of an associated parameter of the target road feature. As a non-limiting example, a target road feature may comprise a lane width of x meters. A first road segment may have a lane width of y meters. If y is within a predetermined threshold of x, the first road segment may still be identified as being associated with the target road feature.

Some examples may comprise receiving a set of excluded road segments associated with prohibitions on vehicle operation; and removing the set of excluded road segments from the map data (i.e., the map data as used in identifying the first road segment, which may for example be a dataset of road segments in a geographical region). Such techniques may both ensure that roads with bespoke prohibitions for vehicle operation which may not otherwise be reflected in the map data are not automatically identified as road segments for simulation. Moreover, this may reduce the available set of road segments, allowing for more efficient search of road segments associated with the target feature.

Some examples may comprise identifying a weight associated with the first road segment, the weight associated with the likelihood the first road segment being traversed by the vehicle in the real world; and initiating the simulation based at least in part on the weight. For example, the weight may be associated with a likelihood of a vehicle traversing the road segment in the real world. Such a weight may be determined, for example, based on a relative percentage of traversals of the segment given a set of previously recorded data. Thus, even though an identified road segment has or is associated with the target road feature, a simulation may not be run including that road segment if it is very unlikely a real-world vehicle would travel on that road segment and/or results from such a simulation may be down-weighted for such associated portions of road.

Some examples may comprise storing an association between the first road segment and the driving simulation scenario in a database. For example, a list of road segments identified and/or simulated for each scenario may be stored. Retaining such information may provide a stable record of which road segments have been used in simulations. This may be particularly important where the simulations are used to generate safety metrics, where it may be necessary to justify the basis of the safety metric at a later date. Importantly, as road identifiers may change over time, such a database may allow simulations to be rerun over previously identified roads without change such that a true determination may be made as to whether the software has improved as opposed to a change being based on a change of the road network.

Some examples may comprise determining a metric indicative of performance, such as a safety metric, associated with the vehicle based at least in part on the simulation(s). For example, the safety of the simulated vehicle during a scenario may be scored. A collective metric representing the safety of operations in a set of scenarios may be determined. In some examples, the score for a scenario may be weighted based at least in part on a metric associated with likelihood of occurrence of that scenario and/or a relative metric for operating on a particular road segment, for example as determined using the techniques discussed above. A control system of the vehicle, such as a planning component, perception component, or prediction component of the vehicle may be updated based at least in part on the metric indicative of performance (e.g., a newer software version may be approved if a safety metric improves). The updated component(s) may be transmitted to one or more vehicles, which may be controlled based at least in part on the updated component(s). Additionally, or alternatively, based at least in part on the safety metric meeting or exceeding a threshold amount, the system may clear one or more vehicles of a fleet of vehicles to drive over particular roads, in particular regions, or in certain scenarios identified by the scenario types meeting those thresholds. In some such cases, one threshold may be used to approve a region for autonomous driving and another threshold may be defined in which a vehicle may drive autonomously with teleoperator input.

Some techniques may comprise receiving a driving simulation scenario associated with simulating a vehicle; generating, based at least in part on the driving simulation scenario, a first metric associated with a likelihood of occurrence of the driving simulation scenario. The first metric may be generated based at least in part on a subset of driving events of a database similar to the driving simulation scenario; identifying, based at least in part on the driving simulation scenario and map data, a first road segment; determining, based at least in part on the dataset and the road segment, a driving metric associated with the road segment indicative of the relative probability of driving on the road segment; initiating a first simulation of the vehicle in accordance with the driving simulation scenario, the first simulation including the first road segment; determining a safety metric associated with performance of the simulated vehicle in the first simulation; determining, based at least in part on the first metric and the driving metric, an aggregate safety metric indicative of performance of the simulated vehicle over all regions and all scenarios; and based at least in part on the aggregate safety metric, transmitting a signal to a vehicle of a fleet of vehicles to be controlled. The first road segment may in some examples be identified based at least in part on an association between a (target) road context associated with the driving simulation scenario and a first road context associated with the first road segment. Thus, in some examples the same abstracted road context may be used to both (a) identify roads to be simulated for a particular scenario, and (b) the likelihood of the scenario occurring. Thus, such techniques may allow simulation scenarios to be designed at a high level, without specific details such as which specific roads to include in the simulation. The techniques may then automatically determine details for implementing the simulation and deriving performance/safety metrics. This for example may allow performance/safety metrics to be regularly updated as scenarios, map data, recorded driving events, and/or vehicle control software are updated. This may ensure that the performance/safety metrics are as accurate as possible. Decisions about deploying vehicles may be made based at least in part on such metrics, and so providing accurate and up-to-date metrics may be important for ensuring that deployed fleets of vehicle are likely to operate safely.

The road context may comprise one or more of: a target road feature, a road network layout, or a position of a simulated agent in relation to the road network layout. Thus, the road context may be or comprise the same target road feature as discussed above, but may also comprise a broader view of the context in which the simulated vehicle is to operate according to the scenario definition.

Techniques may comprise receiving a driving simulation scenario associated with a simulated vehicle; generating, based at least in part on the driving simulation scenario, a first metric associated with a likelihood of occurrence of the driving simulation scenario, the first metric generated based at least in part on a database of driving events associated with the driving simulation scenario; identifying a first road segment in map data; initiating a simulation comprising the simulated vehicle in accordance with the driving simulation scenario, the simulation including the first road segment; and determining a metric indicative of performance of the vehicle based at least in part on the metric and the simulation.

Identifying the first road segment may comprise any of the techniques discussed above comprising identifying a first road segment, for example based at least in part on a target road feature or ability for the driving simulation scenario to be performed in associated with the first road segment.

Generating the metric may comprise any of the techniques discussed above comprising determining a metric associated with likelihood of occurrence of a driving scenario.

The techniques discussed herein can improve functioning of a computer in a number of ways. For example, the techniques may provide computationally efficient ways of automatically generating metrics for scenarios, for example by querying abstracted log data based on scenario type and road context rather than searching raw log data. The techniques may computationally efficient ways of selecting road segments for running simulations. The techniques may further improve the performance and/or safety of vehicles such as autonomous or semi-autonomous vehicles. For example, simulations may be performed to test and/or inform updates to vehicle control software. The techniques allow the basis of such simulations, such as the road segments, to be regularly updated to reflect changing map data or scenario definitions. As such, the techniques may improve the accuracy or relevancy of simulations, allowing vehicle control software to be tested and updated on an improved basis. The techniques provide for improved and automated generation of vehicle safety metrics, based on simulations and metrics associated with likelihood of occurrence of driving scenarios. Improving safety metrics, and providing for regular updates to safety metrics, may ensure that safe vehicle are deployed in the real world.

FIG. 1 is an illustration of an example simulated environment 100, illustrating road segments and a road context in which a vehicle 102 may be simulated. The simulated environment 100 may represent an implementation of a simulation scenario. For example, a simulation may be based on a driving simulation scenario file specifying parameters for implementing a simulation. A simulation may be initiated by a driving simulation computer system (discussed further below) in accordance with the driving simulation scenario file.

The environment 100 may include a road segments 112(1)-112(10) (collectively the road segments 112). In some examples, a different number of road segments may be associated with the example environment 100. A plurality of road segments may be associated with a road. For example, at least road segments 112(1), 112(2), and 112(3) may be associated with a first road. The road segments 112 may be part of map data, which may further include properties of the road segments and/or static features of the environment 100 (e.g., lane markings, lane speed, roadway traffic control information—e.g., stop signs, traffic signals, crosswalks, school zones, speed bumps, and the like). The map data may represent a real-world environment and may be generated based at least in part on sensor measurements recorded by sensors on vehicles traversing the real-world environment.

In some examples, the map data describing the environment 100 may be represented by a graph, a vector representation, or other representation of the environment. In some examples, the vector representation can be determined by a Graph Neural Network which is a type of neural network that operates on a graph structure. Machine-learning based inference operations may be performed to update the state of the graph neural network, including updating nodes and/or edge features, based on internal inputs determined from the graph neural network itself and/or based on updated observations perceived by the vehicles in the real-world environment. The vector can represent a feature of the environment 100 including but not limited to a vehicle, an object, a roadway, a trajectory over time, and so on.

As illustrated, the road segments 112 may represent different areas of the environment 100 (e.g., a real-world environment or a simulated environment) and may include different properties or features. The road segment information may include properties or road features identifying one or more of: geometry information (e.g., width, length, curvature, or other extents), roadway grade, a number of lanes, lane type(s), lane direction of travel, traffic rules (e.g., speed limit, right-of-way, etc.), traffic signs (e.g., lights, signs, etc.), road markings (lane markers, stop line, yield line, crosswalk, etc.), road segment connection information, intersection type (e.g., a type of interchange or road intersection, a number of lanes, etc.), roadway markings, just to name a few. In various examples, the road segment connection information may indicate rules for connecting road segments to ensure that a resultant set of road segments is navigable (e.g., according to road rules, safety considerations, etc.) by a vehicle or other robotic device.

In some examples, a portion of a road segment can include a parking lane, a crosswalk, a sidewalk, traffic information, or other properties/features. For instance, the road segment 112(7) can include one or more crosswalks based on having an area that defines or covers a junction in the environment 100. In various examples, properties of a road segment may comprise one or more of: a length, a width, a curvature, an average curvature, a speed limit, a maximum speed between junctions, a number of lanes, a parking space, a bicycle lane, a driveway, a signaled junction, a non-signaled junction, a public roadway, a private roadway, a roadway marking (e.g., double, single, and/or dashed lines in yellow, white, blue, or another color), a centerline, a roadway boundary, a curb, a crosswalk, a slope, a number of junctions, traffic control sign, traffic control light, a chicken lane, a yield line, a geographical location, and the like.

In various techniques described further below, such properties/features of road segments (or generally of roads) in the map data may be used to identify candidate road segments including in driving simulations initiated according to a simulation scenario.

The lane segments 112 may be, or may be part of, a road context associated with the environment 100. The road context may be an abstracted representation of the road network in environment 100, for example representing properties of the road layout rather than specific identifiers of individual roads or road segments 112. In the present example, the road segments 112 may form an intersection 114. The vehicle 102 may be on road with one lane in each direction. The intersection 114 may have an exit having two lanes in one direction, and one lane in the other direction. Such properties may form part of the road context associated with the intersection 114. As a generalized description of road layout, the same road context may describe multiple different areas in an environment 100. For example, a road context associated with intersection 114 may equally describe another (non-illustrated) intersection.

Various techniques described below may use a road context to identify, for a given desired road context in a driving simulation scenario, recorded driving events that occurred in relation to the same or a similar road context, without having to specify specific geographical locations in the driving simulation scenario. The identified driving events may then be used to determine metrics associated with likelihood of occurrence of the driving simulation scenario, as described in more detail below.

In FIG. 1, the vehicle 102 is illustrated as entering the intersection 114, turning right. The right turn through the intersection 114 may be considered a vehicle maneuver defined in a simulation scenario. That is, as used herein a vehicle maneuver may be associated with operation of the vehicle 102 over a period of time, rather than the instantaneous action of the vehicle 102. For example, at the illustrated position the instantaneous operation of vehicle 112 may still be travelling in a straight line towards the junction, but on a broader time scale, the vehicle 112 may already be engaging in a right turn maneuver.

A simulated agent 104 is also illustrated in FIG. 1. The agent 104 may be another vehicle operating in the environment 100, as illustrated, but in other examples may be any other object in a driving environment such as a pedestrian, bicycle, motorbike, etc. In the illustrated example, the agent 104 is in the lane associated with road segment 112(1), into which the vehicle 102 is turning. In some techniques described below, the position and/or maneuvers of the agent 104 may be defined in relation to the road context, for example rather than being specified in universal coordinates. In non-limiting examples, the position of agent 104 may be defined in relation to a distance to the intersection 114 and/or a lane number representing the lane the agent 104 is in. By defining the agent 104 in relation to the road context, techniques described below may allow identify, for a given driving simulation scenario, driving events in which agents are at desired positions in relation to the road layout, without having to specify particular roads or specific geographical locations of agents. As above, the identified driving events may be used to generate metrics associated with the driving simulation scenario.

Determining Metrics Associated with Likelihood of Occurrence

Figure 2:
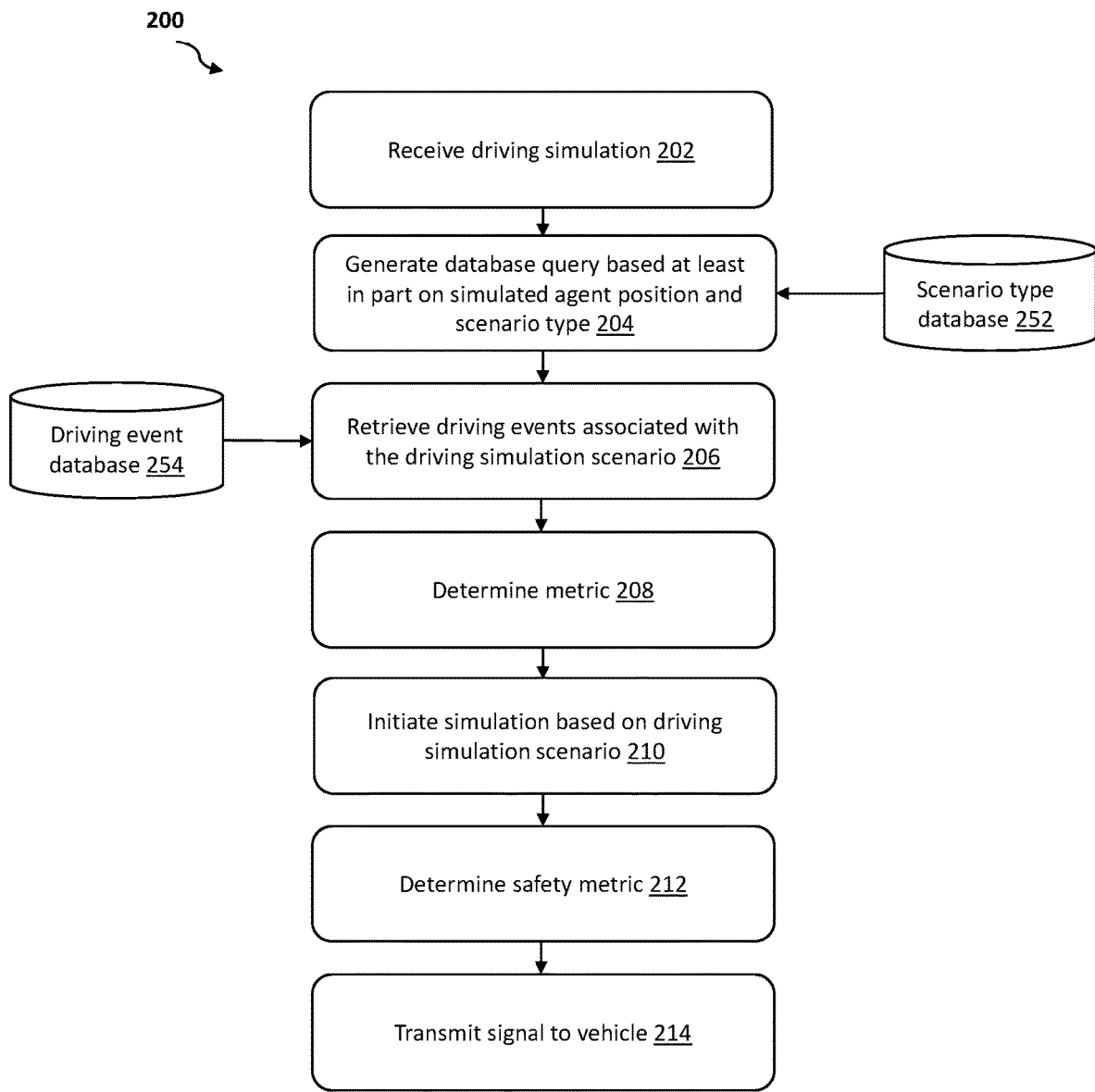
FIG. 2 shows a flow chart of a process for determining a first metric.

FIG. 2 illustrates an example process 200. Process 200 may be implemented on a system comprising one or more processors and one or more non-transitory computer-readable media storing instructions that, when executed, perform the operations of process 200. Process 200 may be implemented as one or more transitory or non-transitory computer-readable media storing instructions executable by one or more processors, wherein the instructions, when executed, cause the one or more processors to perform the operations of process 200. Process 200 may be implemented as a computer program comprising instructions which, when executed by a computer device, cause the computer device to perform the operations of process 200. Process 200 may be implemented on computer device(s) 832 described below in relation to FIG. 8.

Process 200 may comprise operation 202. Operation 202 may comprise receiving a driving simulation scenario (e.g., a driving simulation scenario definition file). The driving simulation scenario may specify a maneuver for a simulated vehicle (such as vehicle 102). The driving simulation scenario may specify a position and/or maneuver of a simulated agent (such as agent 104) proximate the simulated vehicle. The position or maneuver may be associated with a road context to be simulated. The driving simulation scenario may specify a road context in which the simulated vehicle is to operate. As discussed above, road context may represent a desired road layout to be simulated in abstracted manner, rather than specifying specific road, road segments, intersections, etc. in map data. An agent position or maneuver may be defined in relation to the road context, for example in relation to a desired intersection type defined in the driving simulation scenario, as discussed above. In various examples, one or more such scenarios may be defined based on ensuring the vehicle is able to safely operate in a given region.

Process 200 may comprise operation 204. Operation 204 may comprise generating a database query based at least in part on the driving simulation scenario. For example, the database query may be based at least in part of one or more of: the scenario type, agent information, road context and/or parameters of the scenario specified for query. As a non-limiting example, a position of the simulated agent associated with the road context (or generally based at least in part on road context) and/or the vehicle may be used. As a particular example, a scenario may specify passing a double-parked vehicle which is located at least 5 m ahead of the vehicle on a two-lane road. In response to such an example, the query may search over all observations to determine occurrences in log data that match those parameters within some threshold. In various examples of which, such a matching may be performed by determination of embeddings of the scenario type and those observed scenarios in log data and determining a distance therebetween, wherein matching scenarios are determined to have a distance less than or equal to a threshold distance. Such a distance between embeddings may be considered an example of a similarity metric. In other words, a query is generated based on indexing parameters specified in the simulation scenario such as the scenario type (determined from simulated vehicle information), agent information, road context, and the like. Separating the simulated vehicle information from the agent information in the query may allow for computationally efficient query generation, for example as compared to the determining searchable representations of the complex relationship between simulated vehicle and agents. Treating the scenario type independently of the agent information may also allow the scenario type associations to be pre-determined, reducing computational burden during process 200 as discussed above.

As noted above, in some examples the driving simulation scenario may specify, comprise, or otherwise be associated with a scenario type. A scenario type may be a category of driving scenario to which the driving simulation scenario belongs or is associated with. In non-limiting examples, scenario types may be or comprise one or more of: continuous driving, entering a road, exiting a road, turning, approaching an intersection, traversing an intersection, picking up a passenger, or dropping off a passenger. In operation 204, the scenario type may be determined based on the desired behavior of the simulated vehicle, rather than information associated with the agent(s) or any other properties of the simulated environment. In general, the scenario type may be associated with at least in part one or more of: a vehicle mode (e.g., continuous driving mode), a position of the simulated vehicle, or a maneuver to be performed by the simulated vehicle. As discussed above, the scenario type may be used as a first indexing parameter for identifying driving events.

In some examples, the scenario type for a given driving simulation scenario may be identified based at least in part on a predetermined association between vehicle maneuvers (as specified in the driving simulation scenario) and scenario types. For example, operation 204 may comprise looking-up a scenario type in a scenario type database 252 or look-up table. Scenario type database 252 may be stored in memory associated with the computing device implementing process 200. The scenario type database 252 may store pre-calculated associations between vehicle maneuvers and scenario types. Pre-determining such associations may reduce the computational burden and time required to determine the scenario type when running operation 200. In particular, each association between a vehicle maneuver (or other factors listed above) and a scenario type may be likely to be used multiple times by different scenarios, so pre-determining and storing the associations may save significant computing resources when repeatedly processing multiple scenarios. In addition, pre-determining the associations may enable additional verification to be performed to ensure accuracy, without costing time when running operation 200.

Process 200 may comprise operation 206. Operation 206 may comprise retrieving from a database, based at least in part on the database query, a plurality of driving events associated with the driving simulation scenario. For example, driving events may be retrieved from a driving event database 254, which may be stored in memory associated with the computing device(s) implementing operation 200.

The database may comprise abstracted log data (or otherwise) representing vehicle and/or agent maneuvers associated with driving log data. Driving log data may be raw data recorded by sensors on vehicles traversing real-world environments. For example, a vehicle may comprise one or more of: radar sensors, lidar sensors, ultrasonic sensors, cameras, GPS systems, accelerometer, torque sensors, etc. As the vehicle traverse the environment, the sensors may record measurements of vehicle properties such as speed, acceleration, position, etc., and/or properties of the environment such as speed and position of agents around the vehicle. Such data may be transmitted to a remote computer device and may be stored with data from other vehicles in the same or other environments as raw log data. Raw log data may be very detailed and may represent instantaneous properties of the vehicle and the environment. As such, searching log data to identify recorded events may be computationally burdensome. The database used in operation 208 may instead store abstracted versions of log data. For example, the abstracted log data may store vehicle maneuvers (e.g., associated with operation of the vehicle over a period of time, such as over a predetermined period of time (e.g., 5 seconds or more, 10 seconds or more)), rather than instantaneous vehicle properties. Thus, in a non-limiting example, where raw log data may specify that the wheel position of the vehicle was at x degrees at a particular time stamp, the abstracted log data may record that the vehicle performed a right turn. Searching for records of such abstracted maneuvers may be faster and computationally easier than searching raw log data, as the data is effectively indexed by a higher-level label. Additionally, or alternatively, as alluded to above, such scenarios may be encoded as embeddings such that the embedding alone is stored and searched against.

A driving event may comprise a sequence of log data representing a situation experienced by the recording vehicle as it traversed the environment. A driving event may be classified according to the scenario type it is associated with, for example based on the maneuver the recording vehicle performed during the driving event. Operation 206 may comprise identifying driving scenarios associated with the same scenario type as the driving scenario. As a non-limiting example, if the scenario type comprises traversing an intersection, operation 206 may retrieve driving scenarios where the recording vehicle traversed an intersection. Driving events may be further classified according to agent information and/or road context. Operation 206 may comprise identifying driving scenarios which match, or are otherwise associated with, both the scenario type of the desired scenario and the agent information of the desired scenario.

In some examples, the driving simulation scenario may be associated with a geographical region or geofence. For example, although a scenario definition may be applied to any geographical region, during a particular run it may be desired to perform simulations only of a specified geographical region. Accordingly, the database in operation 206 may comprise (e.g., only comprise), abstracted log data associated with the specified geographical regions. In some examples, operation 206 may comprise an initial process of retrieving abstracted log data associated with the specified geographical region from a larger database associated with multiple regions. In some examples, abstracted log data associated with a geographical region may be derived from sensor measurements performed as vehicles traversed that region. In other examples, abstracted log data associated with a geographical region may be derived from sensor measurements performed as vehicles traversed a similar geographical region to the specified region. For example, a similar region may be a nearby region (e.g., within a predetermined distance of the region), a region with a similar road layout, a region with a similar urban density, etc. Similar regions may particularly be used where vehicles have not yet recorded data in the specified region, allowing the process 200 to be used even in regions where data has not yet been recorded.

Process 200 may comprise operation 208, comprising determining, based at least in part on the plurality of driving events, a metric associated with a probability of the driving simulation scenario (i.e., a likelihood of occurrence). Determining the metric may comprise determining one or more statistical models representing parameters associated with the plurality of driving events, such as mixture models (e.g., Gaussian mixture models). For example, the models may be associated with the frequency of occurrence of values of parameters associated with the retrieved driving events. In a non-limiting example, in the illustration of FIG. 1, the vehicle 102 is turning right into a lane containing agent 104. Driving events may be retrieved associated with the primary vehicle performing a right turn into a lane with a second vehicle (i.e., agent 104) already present. The speed of the second vehicle in each driving event may be identified, and a statistical model may be determined representing the of various values of the speed of the second vehicle. Similar models may be generated for other parameters associated with the driving events. An overall metric may be determined representing the combined probability of a particular set of parameters. Such metrics may be used to determine one or more parameters in initiating a driving simulation in accordance with the driving simulation scenario. For example, the most likely value of one or more parameters may be identified and applied to the scenario. As such, some examples may comprise initiating (or not) a driving simulation scenario based at least in part on the metric(s) determined in operation 208. In other examples, the metric associated with likelihood of a scenario may used to determine a metric indicative of performance of the vehicle, for example in combination with results of simulations, as discussed further below. Further details on determining metrics based on recorded log data may be found in US20210347372, which is incorporated herein by reference in its entirety for all purpose.

In some examples, operation 206 may comprise retrieving an identifier associated with the driving event from the abstracted log data. Raw log data associated with the driving event may then be retrieved, e.g., from a raw log database, based at least in part on the identifier. Thus, while the driving events may be retrieved based on abstracted log data, the full raw log data may still be used to determine the metric(s), which may provide a greater level of detail for determining the metric than would be available from the abstracted log data.

Some examples may comprise determining an updated metric associated with the updated driving simulation scenario and/or updated log data and/or based at least in part on a predetermined schedule (e.g., daily, weekly, etc.). The computational efficiency of process 200 may allow metrics to be re-generated on a regular basis, providing up-to-date values for further decision making such as whether to operate a fleet of vehicles in a particular region.

Process 200 may further comprise operation 210. Operation 210 may comprise initiating a simulation based at least in part on the driving simulation scenario. Initiating a simulation is discussed further below in relation to operation 408 of process 400.

Process 200 may comprise operation 212. Operation 212 may comprise determining, based at least in part on the simulation and the metric, a safety metric. The safety metric may be indicative of performance of the simulated vehicle in the simulation, i.e., indicative of performance of the simulated vehicle in the driving simulation scenario. Including the metric associated with likelihood of occurrence of the driving simulation scenario may allow the safety metric to be determined based on the simulated vehicle's performance in a wide range of driving scenarios, including rare scenarios, without the rare scenarios disproportionately affecting the safety metric.

Process 200 may comprise operation 214. Operation 214 may comprise transmitting, based at least in part on the safety metric meeting or exceeding a threshold safety value, a signal to a vehicle (or multiple vehicles) of a fleet of vehicles in a real-world environment. The signal may be configured to control the vehicle(s) to one or more of drive or refrain from driving in a region of the real-world environment associated with the driving simulation scenario. Additionally or alternatively, the signal may be configured to control the vehicle(s) to allow the vehicle to perform a maneuver (e.g., a maneuver associated with the driving simulation scenario), or to prevent the vehicle performing such a maneuver.

Some examples may further comprise modifying a parameter associated with the driving simulation scenario to create an altered driving simulation scenario. For example, the parameter may comprise an object type, e.g., comprising one or more of a car, a truck, a pedestrian, a motorcycle, or a bicycle. A modified metric associated with likelihood of occurrence of the altered driving scenario may be determined. The modified metric may be determined based at least in part on the original metric, for example by scaling (e.g., applying a weight) the original metric based at least in part on the parameter, or change in parameter. As such, metrics may be determined for multiple related scenarios without having to perform the full set of operations of process 200 again.

Figure 3:
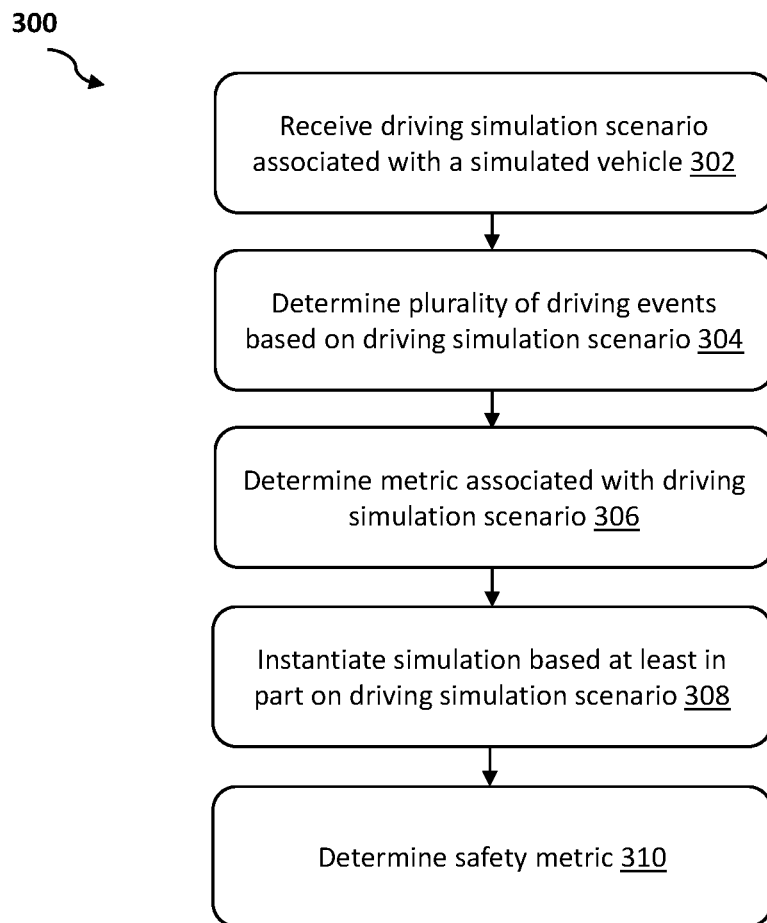
FIG. 3 shows a flow chart of a further process for determining a first metric.

FIG. 3 illustrates an example process 300. Process 300 may be implemented on a system comprising one or more processors and one or more non-transitory computer-readable media storing instructions that, when executed, perform the operations of process 300. Process 300 may be implemented as one or more transitory or non-transitory computer-readable media storing instructions executable by one or more processors, wherein the instructions, when executed, cause the one or more processors to perform the operations of process 300. Process 300 may be implemented as a computer program comprising instructions which, when executed by a computer device, cause the computer device to perform the operations of process 300. Process 300 may be implemented on computer device(s) 832 described below in relation to FIG. 8.

Process 300 may comprise operation 302. Operation 302 may comprise receiving a driving simulation scenario. The driving simulation may associated with a simulated vehicle. In some examples the driving simulation may also be associated with a a simulated agent, such as another vehicle proximate to the simulated vehicle. Operation 302 may be similar to operation 202 above.

Process 300 may comprise operation 304. Operation 304 may comprise determining, based at least in part on the driving simulation scenario and a dataset of recorded driving associated with operation of a test vehicle in an environment, a plurality of driving events present in the dataset.

In some examples operation 304 may comprise determining the plurality of driving events based at least in part on a scenario type associated with the driving simulation scenario. In some examples the scenario type may be specified in the driving simulation scenario. In other examples the scenario type may be identified based on, for example vehicle operations defined in the driving simulation scenario.

In some examples operation 204 may comprise determining the plurality of driving events based at least in part on, simulated agent information comprising one or more of: a simulated agent position or a simulated agent maneuver. As discussed above, the agent information be associated with a road context associated with the driving simulation scenario.

Process 300 may comprise operation 306. Operation 306 may comprise determining, based at least in part on the plurality of driving events, a metric associated with a likelihood of occurrence of the driving simulation scenario. As a non-limiting example of which, such a metric may comprise a relative probability of observing the queried scenario relative to all scenarios in the database (which may be limited to a particular geographic region). Operation 310 may be similar to operation 208 above.

Process 300 may comprise operation 308. Operation 308 may comprise instantiating a simulation based at least in part on the driving simulation scenario. Operation 308 may be similar to operation 210 above.

Process 300 may comprise operation 310. Operation 310 may comprise determining, based at least in part on the simulation, a safety metric indicative of the safe performance of the simulated vehicle in the simulation. In some examples, operation 310 may comprise determining, based at least in part on the safety metric and the metric determined in operation 306, an aggregate safety metric. Operation 310 may comprise, based at least in part on the aggregate safety metric, transmitting a signal to a vehicle of a fleet of vehicles to be controlled autonomously. Operation 310 may be similar to operation 212 above.

Identifying Road Segments

Figure 4:
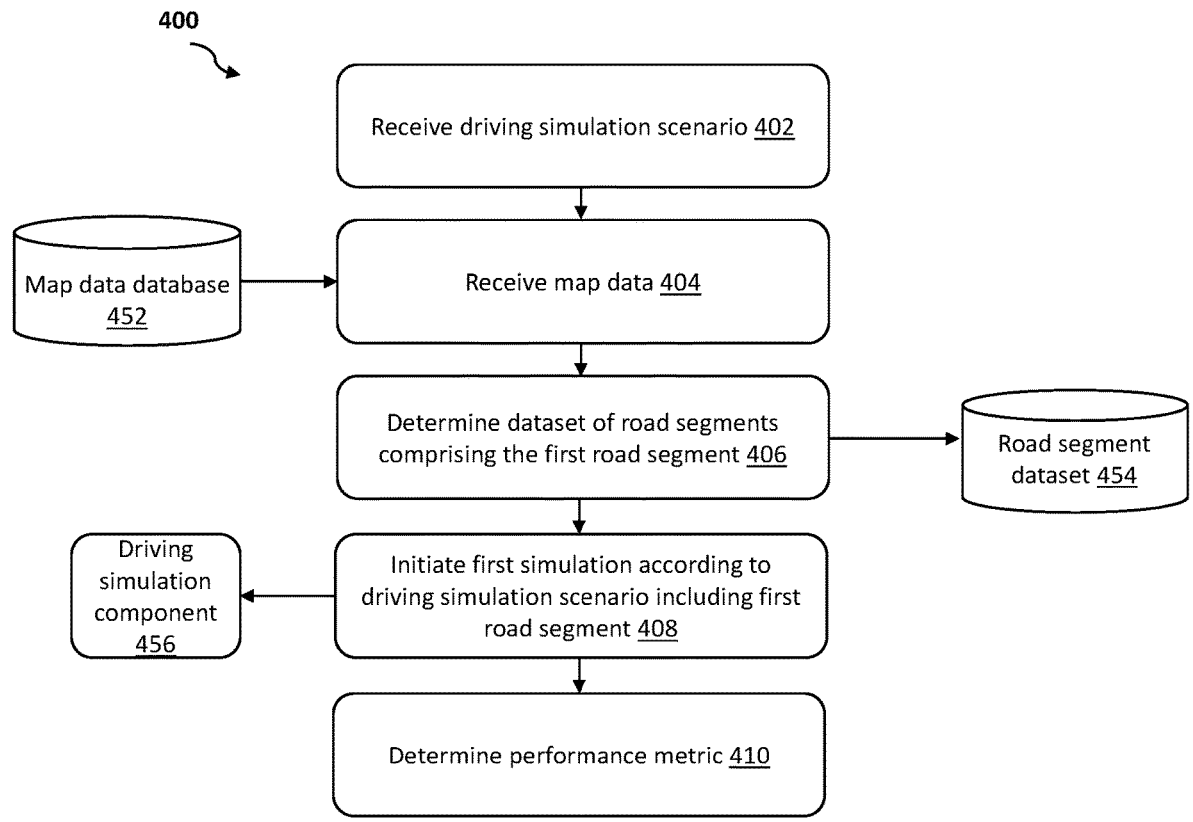
FIG. 4 shows a flow chart of a process for determining a performance metric.
Figure 5:
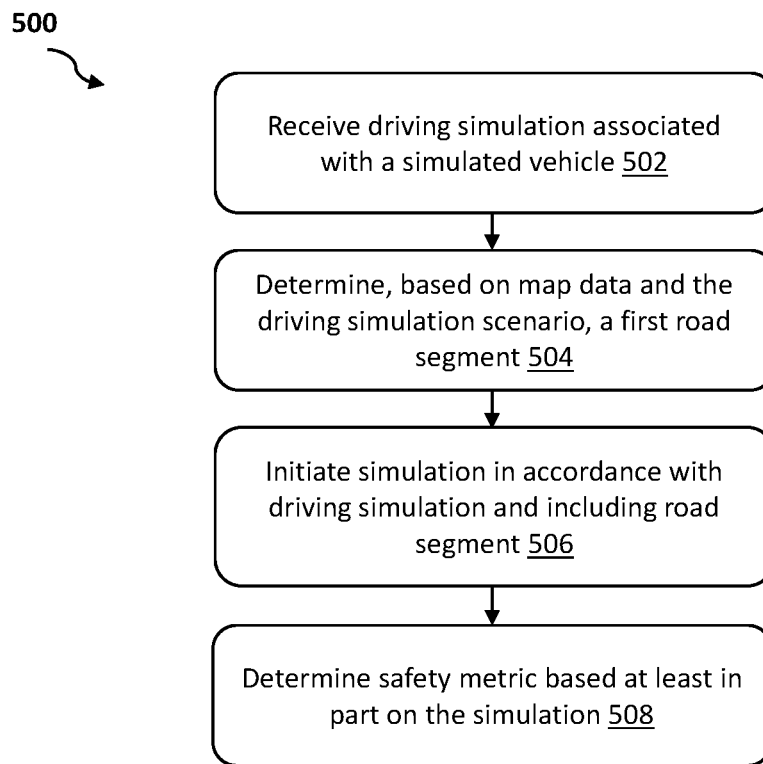
FIG. 5 shows a flow chart of a further process for determining a performance metric.

The techniques described above may provide dynamically updatable metrics representing a likelihood of driving simulation scenarios, based at least in part on abstracted representations of vehicle maneuvers. Driving simulations may typically be performed to simulate real-world road networks. Conventionally, this may be achieved by specifying particular roads or road segments in the definition file for a driving scenario, for example by listing identifiers of road segments on which simulations should be run. However, such approaches may require manual changes if it is desired to run the simulation in a different area. Moreover, as map data may be continually updated for example based on receiving new measurements from the real-world environment, road segment identifiers may change over time. As such, a driving simulation scenario definition may become out-of-date, again requiring manual intervention of the simulation is to be run using the updated map data. FIGS. 4 and 5 illustrated example processes for dynamically identifying, for example when it is desired to run a simulation, roads or roads segments for the driving simulation scenario. In particular, by using abstracted representations of road segments in the scenario definition file, the techniques below may allow a driving scenario to be applied to any suitable map data without requiring user intervention.

FIG. 4 illustrates an example process 400. Process 400 may be implemented on a system comprising one or more processors and one or more non-transitory computer-readable media storing instructions that, when executed, perform the operations of process 400. Process 400 may be implemented as one or more transitory or non-transitory computer-readable media storing instructions executable by one or more processors, wherein the instructions, when executed, cause the one or more processors to perform the operations of process 400. Process 400 may be implemented as a computer program comprising instructions which, when executed by a computer device, cause the computer device to perform the operations of process 400. Process 400 may be implemented on computer device(s) 832 described below in relation to FIG. 8.

Process 400 may comprise operation 402. Operation 402 may comprise receiving a driving simulation scenario associated with simulating a vehicle. Operation 402 may be similar to operation 202 above. The driving simulation scenario may in some examples specify or otherwise be associated with a target road feature associated with simulated operation of the vehicle. In non-limiting examples, the target road feature may comprise one or more of: an a road layout, an intersection type, a number of lanes, a lane type, a length, a curvature, a slope, a traffic rule, an object, or a traffic rule. The target road feature may be associated with an individual road segment, a plurality of road segments, or one or more roads. The target road feature may be, or may be part of, the road context of a scenario as discussed above. For example, considering the illustration in FIG. 1, the target road feature(s) may be an intersection with at least two exits, and/or a road having three lanes. Additionally or alternatively, the driving simulation may specify, comprise, or otherwise be associated with one of more vehicle maneuvers, for example maneuvers that the simulated vehicle is to perform when the driving simulation is executed, and/or maneuvers that other vehicles or objects around the simulated vehicle are to perform.

Process 400 may comprise operation 404. Operation 404 may comprise receiving map data. The map data may comprise a first road segment associated with a first road feature and may in some examples comprise a second road segment associated with a second road feature. For example, the map data may comprise the road segments 112 illustrated in FIG. 1, i.e., specific road segments in map data associated with specific locations. As will be appreciated, the map data may comprise many more road segments than a first road segment and a second road segment. The map data may be received from a map data database 452, which may for example be stored in memory associated with the computing device(s) implementing process 400. As discussed above, the map data may comprise a directed graph of road segments, which together represent the road layout of an environment.

As discussed above in relation to process 200, in some examples it may be desired to run simulations in particular geographic regions or geofences. Accordingly, in some examples the map data received in operation 404 may be associated with a specified geographic region. In other examples operation 406 described below may query the map data only for road segments associated with the specified geographic region.

Some examples may comprise excluding a set of road segments from the map data. For example, process 400 may comprise receiving a set of excluded road segments associated with prohibitions on vehicle operation (e.g., real-world areas where operation of autonomous vehicles is prohibited, and as such performing simulations in such areas would be a waste of resources). Process 400 may comprise removing the set of excluded road segments from the map data, for example by generating a refined map data omitting the excluded road segments and using the refined map data in the operations below.

Process 400 may comprise operation 406. Operation 406 may comprise determining, based at least in part on the map data and the driving simulation scenario, a dataset of road segments comprising the first road segment. For example, operation 406 may comprise querying the map data for road segments associated with the target road feature and/or for road segments on which the driving simulation scenario (e.g., one or more vehicle maneuvers of the driving simulation scenario) can be performed. For example, a query specifying one or more target road features may be generated and used to search the map data database 452. As above, such a query need not necessarily be limited to features of the road segment, per se, but may be indirectly performed based on the queried type of interaction/scenario. In response, a number of road segments may be returned in which the queried scenario is capable of being performed. In some instances, such a response may be further limited based at least in part on additional parameters of the road as specified. As a non-limiting example, a scenario may be specified in which a vehicle approaches an intersection with another object. Without further specifying any parameters, road segments may be returned associated with any one or more of 3-, 4-, and 5-way intersections, roundabouts, crosswalks, etc. However, if a context is provided (e.g., not roundabouts and not crosswalks), only that subset of road segments may be returned which do not match those specified.

Operation 406 may comprise creating a dataset of road segments, for example, based at least in part on a similarity (or generally, an association) between the target road feature and the first road feature, and between the target road feature and the second road feature. For example, if the first/second road feature matches the target road feature, the first/second road segment may be identified as a candidate road segment for simulating the driving scenario in an environment including the first/second road segment. If the first/second road feature does not match the target road feature, the first/second road segment may be excluded from the dataset.

In some examples, the similarity/association between the target road feature and the first road feature may be that the first road feature matches the target road feature. For example, if the target road feature is a crosswalk, a first road segment having a crosswalk may be identified. The similarity/association may be that the first road feature comprises the target road feature. For example, the target road feature may an intersection with at least two exits. The first road segment may then be associated with an intersection having three exits—i.e., including two exits. The association/similarity may be that the first road feature includes part of the target road feature. The association/similarity may be that the first road feature has a parameter within a predetermined threshold of an associated parameter of the target road feature. For example, if the target road feature is a speed limit of 30 mph, the first road feature may be a speed limit of 35 mph, where in this example the predetermined threshold is 5 mph. Similar considerations apply for the association/similarity between the second road feature and target road feature.

In general, determining the dataset of road segments may comprise determining road segments in the map data on which the driving simulation scenario is capable of being performed. This may comprise a road segment being associated with a target road feature, as above. Additionally or alternatively, this may comprise the road segment being suitable for a vehicle maneuver to be performed on it.

It is noted that although described in terms of identifying single road features, in some examples a target road feature may be associated with a plurality of road segments. The plurality of road segments may be added to the road segment database 454 in operation 406 and/or associated with a particular scenario. Further, a driving scenario may be associated with a plurality of target road features, and respective sets of road segment(s) associated with one or more of the plurality of target road features. A simulation may then be initiated including a set of road segments. By storing such targets, evaluations may be performed over previous information despite changes in the road network, road segment identifier, etc.

The dataset of road segments created in operation 406 may be used to determine which roads/road segments to include in simulations of the driving scenario received in operation 402. In some examples, simulations may be run for all of the road segments identified in operation 406. For example, this may allow performance of an autonomous vehicle (or more specifically, the control systems of the autonomous vehicle, such as the planning, prediction, and/or perception components discussed in more detail below in relation to FIG. 8) to be tested in a wide variety of road areas, as long as each of those road areas are associated with the target road feature(s) for the given scenario.

In other examples, simulations may be run for only a subset of the road segments identified in operation 406. For example, it may be that some road segments (or the wider areas they belong to) are similar to other road segments (or their corresponding areas). There may be limited extra information gained from running different simulations in similar road areas. Running driving simulations may be computationally expensive. As such, some examples may exclude one or more road segments from the simulation runs, for example based on a similarity between road segments. Further detail of reducing the road segments to simulate based for example on similarity may be found in U.S. application Ser. No. 18/225,658 entitled "Road Segment Determination for Vehicle Operations," filed Jul. 24, 2023, which is incorporated herein by reference in its entirety for all purposes.

Further, or alternatively, in some examples there may be multiple driving simulation scenarios to be run, each having similar road requirements. For example, some examples may comprise receiving a second driving simulation scenario specifying the target road feature (i.e., the same target road feature as in the scenario received in operation 402). Process 400 may comprise creating a second dataset of road segments based at least in part on the first dataset (or in general, re-using the dataset or a part thereof for the second scenario). For example, the second dataset may comprise all of the road segments identified in operation 408. Alternatively a subset of road segments may be selected, for example where it is desired to run the second scenario on different road segments to the original scenario. Such examples may efficiently re-use the selection of road segments where scenarios have similar road requirements, reducing the computational cost of performing process 400 for a large set of driving scenarios.

Returning to FIG. 4, process 400 may comprise operation 408. Operation 408 may comprise initiating a first simulation of the vehicle in accordance with the driving simulation scenario, the first simulation including the first road segment. A simulation may be performed by a driving simulation component 456, which may execute simulations of the vehicle (or its control systems such as the planning component) based at least in part on parameters specified in the driving simulation scenario. As discussed above in relation to FIG. 2, some parameters may be determined or adjusted based at least in part on metrics associated with likelihood of occurrence of the parameters in log data. The simulation may be executed such that the vehicle is simulated as operating on, or in association with, a road network including the first road segment. Further details of simulating driving scenarios may be found in U.S. Pat. No. 11,734,473, which is incorporated herein by reference in its entirety for all purposes.

Some examples may further comprise initiating a second simulation of the vehicle in accordance with the driving scenario, the second simulation including the second road segment. In other words, the same (or substantially the same) driving scenario may be simulated twice, but with different road segments. Initiating the second simulation may be similar to operation 408, but with the second road segment rather than the first road segment. Additionally, or alternatively, the same road segments may be used with a differing set of parameters. For example, the object type may be changed (from car to truck), starting states may be modified, or the like. Such modifications may be associated with altering (e.g., scaling) the probability metric of the scenario as determined above such that the relative contribution of the scenario as a whole is accounted for.

Some examples may comprise associating a weight to one or more road segments. For example, a first weight may be associated with the first road segment. The weight may be associated with likelihood of a real-world vehicle traversing that road segment. Simulations may be initiated based at least in part on weights assigned to road segments. For example, a simulation may be initiated for a road segment which is likely to be traversed by the vehicle, whereas a road segment that is unlikely to be traversed may not be simulated, even though it has the target road feature. In other examples, the metric determined in operation 414 may be adjusted according to the weight, for example to give more weight in the metric to simulations involving road segments likely to be traversed in the real world. Additionally, or alternatively, all scenarios may be run and the results of which may be further scaled based at least in part on the weight. As such, a total contribution of a scenario may be based on both the probability metric as well as the weight.

Process 400 may comprise operation 410. Operation 410 may comprise determining, based at least in part on the first simulation (and optionally any other simulations based on other road segments of the dataset, such as the second simulation discussed above), a metric indicative of performance of the vehicle. For example, a safety metric may be determined. The metric may be associated with how well the vehicle performed (e.g., responded) to the events in the scenario. For example, the metric may be based at least in part on a comparison to a predetermined outcome of the scenario and/or based at least in part on whether any predetermined rules were broken.

In some examples, the metric indicative of performance determined in operation 410 may be based at least in part on the metric associated with probability as determined according to process 200 or 300 above and/or the weight for the various road segments. For example, the metric indicative of performance may be a combination of the performance of the vehicle in the simulation(s) of a driving scenario and the likelihood of that scenario occurring in log data/the real world. The metric indicative of performance may be associated with a plurality of driving scenarios (and, optionally, metrics respectively associated with likelihood of occurrence of each driving scenario). As such, an overall metric may be determined for how well the software performs over a given region accounting for both the frequency of a particular scenario occurring, as well as the frequency with which one or more road segments are driven on based on historic observations of driving. In such examples, poor performance in a given scenario may be addressed (e.g., by modifying underlying software, requiring additional safety mechanisms—e.g., reducing speeds or changing other thresholds, etc.), while determining whether, as a whole, the vehicle is safely able to operate in the region.

Some examples may comprise transmitting, based at in part on the metric, a signal to a vehicle in a fleet of vehicles to drive autonomously within a real-world environment. For example, the signal may permit or forbid the vehicle to drive in a particular region, or on a particular road/road segment, such as a region or road as represented in the map data. The signal may permit or forbid the vehicle to perform a vehicle maneuver, such as a maneuver performed as part of the driving simulation scenario. For example, vehicles may be allowed to operate (e.g., in a region, or perform a maneuver) only if the metric indicative of performance meets or exceeds a predetermined threshold. In some examples, vehicle control components such as a planning component may be updated based at least in part on the metric indicative of performance. For example, the metric indicative of performance may indicate that improvement is needed. The updated control component(s) may then be transmitted to one or more vehicles, and which may be controlled based at least in part on the updated control component(s) in the real world.

The process 400 may be repeated, for example based on an update to the map data, log data, or scenario(s), and/or periodically. The process 400 may thus provide a dynamically updatable list of road segments to use for simulations, without requiring manual intervention.

FIG. 5 illustrates an example process 500. Process 500 may be implemented on a system comprising one or more processors and one or more non-transitory computer-readable media storing instructions that, when executed, perform the operations of process 500. Process 500 may be implemented as one or more transitory or non-transitory computer-readable media storing instructions executable by one or more processors, wherein the instructions, when executed, cause the one or more processors to perform the operations of process 500. Process 500 may be implemented as a computer program comprising instructions which, when executed by a computer device, cause the computer device to perform the operations of process 500. Process 500 may be implemented on computer device(s) 832 described below in relation to FIG. 8.

Process 500 may comprise operation 502. Operation 502 may comprise receiving a driving simulation scenario associated simulating a vehicle in an environment. The driving simulation scenario may be associated with a target road feature and/or vehicle maneuver. Operation 502 may be similar to operation 402 above.

Process 500 may comprise operation 504. Operation 504 may comprise receiving map data comprising a first road segment associated with a first road feature. Operation 504 may be similar to operation 404 above.

Process 500 may comprise operation 506. Operation 506 may comprise initiating a simulation of the vehicle in accordance with the driving simulation scenario the simulation including the first road segment. Operation 508 may be similar to operation 408 above.

Process 500 may comprise operation 508. Operation 508 may comprise determining a safety metric based at least in part on the simulation. The safety metric may for example be associated with autonomous operation of the simulated vehicle in a region comprising the road segment. Operation 508 may be similar to operation 410 above.

Process 500 may further comprise transmitting to a vehicle of a fleet of vehicles in a real world environment to one or more of drive or refrain from driving in the region based at least in part on the safety metric.

Determining Performance Metrics

Figure 6:
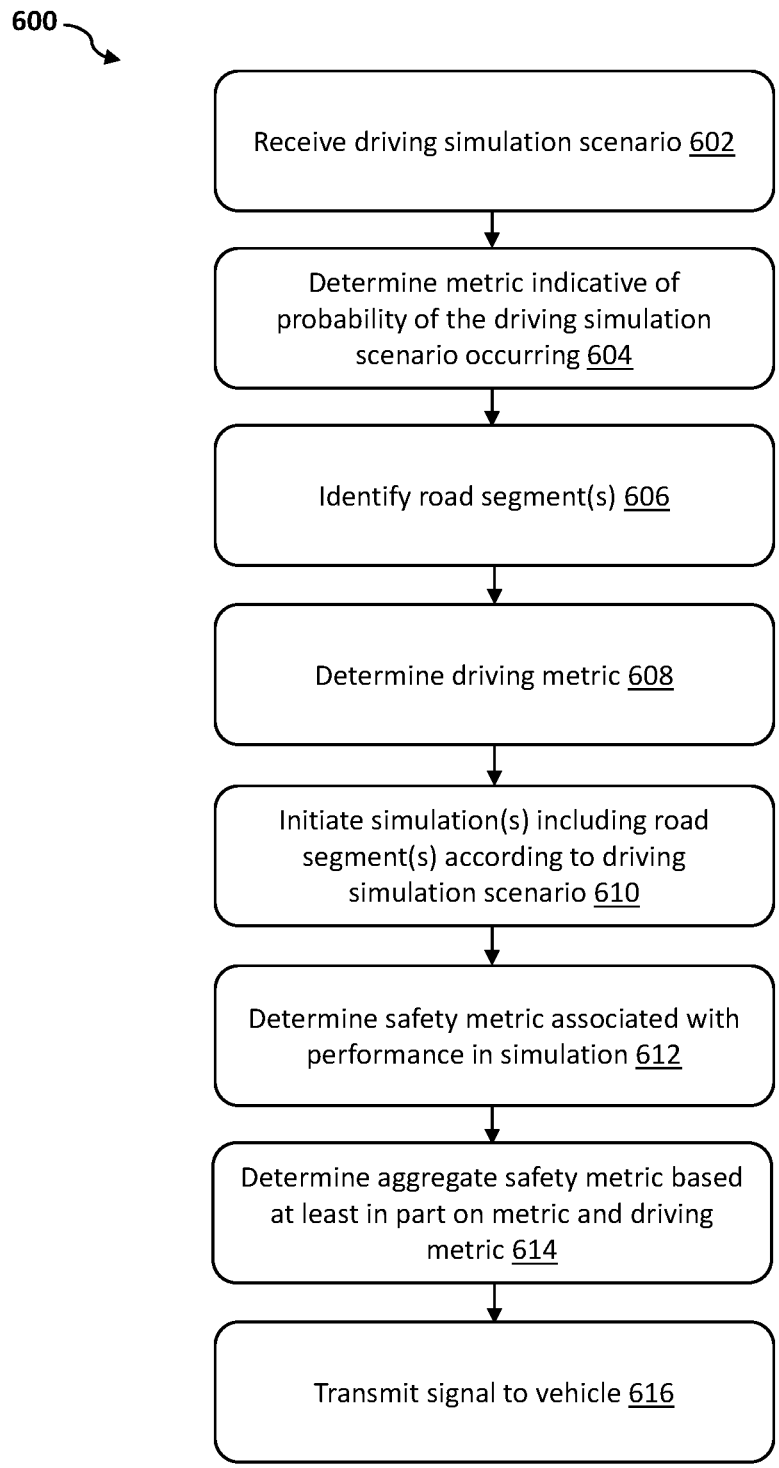
FIG. 6 shows a flow chart of a further process for determining a performance metric.
Figure 7:
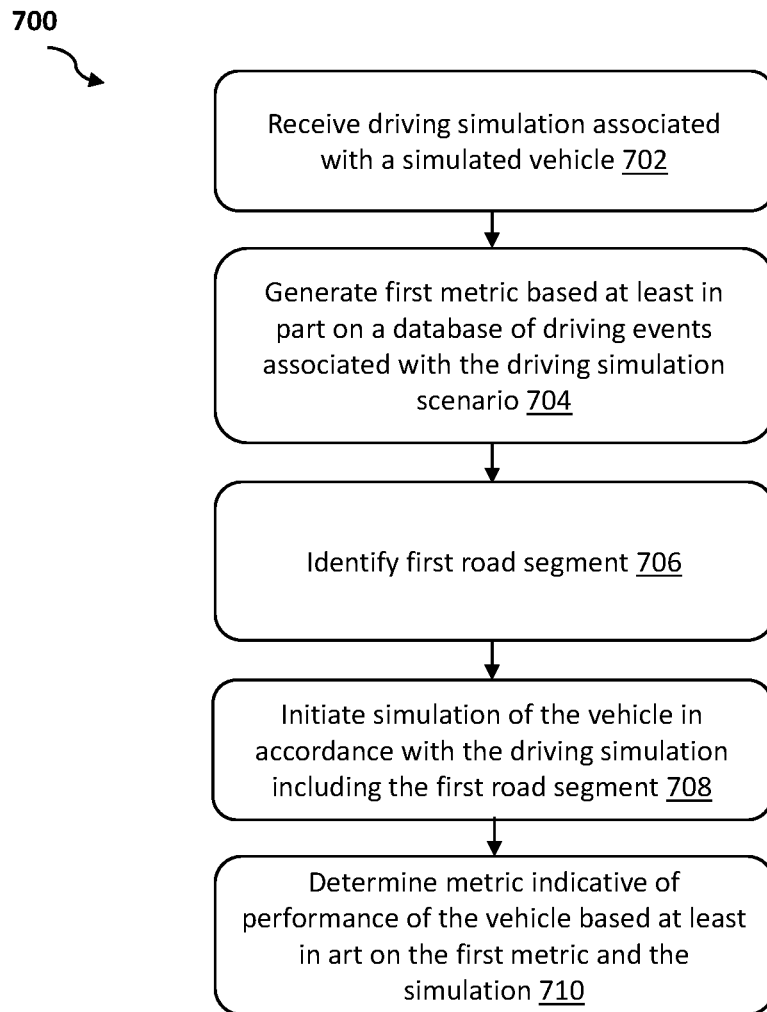
FIG. 7 shows a flow chart of a further process for determining a performance metric.

FIGS. 6 and 7 illustrate processes combining elements of the processes 200-500 above to determine metrics indicative of performance of a vehicle, such as an autonomous or semi-autonomous vehicle.

FIG. 6 illustrates an example process 600. Process 600 may be implemented on a system comprising one or more processors and one or more non-transitory computer-readable media storing instructions that, when executed, perform the operations of process 600. Process 600 may be implemented as one or more transitory or non-transitory computer-readable media storing instructions executable by one or more processors, wherein the instructions, when executed, cause the one or more processors to perform the operations of process 600. Process 600 may be implemented as a computer program comprising instructions which, when executed by a computer device, cause the computer device to perform the operations of process 600. Process 600 may be implemented on computer device(s) 832 described below in relation to FIG. 8.

Process 600 may comprise operation 602. Operation 602 may comprise receiving a driving simulation scenario associated with simulating a vehicle. In some examples the driving simulation scenario may be associated with a scenario type and a road context (e.g., agent information with respect to a road context). Operation 602 may be similar to operation 202 above.

In some examples, the driving simulation scenario may be associated with a simulated agent, such as another vehicle to be simulated near the primary simulated vehicle. Process 600 may comprise receiving a default agent representation associated with the simulated agent. For example, the default agent representation may comprise default properties associated with the simulated agent, such as geometrical properties or other appearance properties. The process 600 may further comprise applying, based at least in part on the driving simulation scenario, a behavioral property to the default agent. Thus, the default agent provide a ready-made starting point for simulating a particular agent, which may be used for multiple different scenarios to reduce processing time. The default agent may be tailored to the particular driving scenario received in operation 602 by applying one or more behavioral parameters, such as aggression. When a simulation is initiated based on the simulation scenario, the tailored agent behavior may be used to simulate the agent.

Process 600 may comprise operation 604. Operation 604 may comprise determining a metric associated with a likelihood of occurrence of the driving simulation scenario. The metric may be determined based at least in part on a subset of driving events of a database similar to the driving simulation scenario. For example, the database of driving events may comprise abstracted log data derived from real-world measurements. Operation 604 may comprise any of the examples discussed above in relation to operations 204-208 and/or operations 304-306.

Process 600 may comprise operation 606. Operation 606 may comprise identifying, based at least in part on the scenario, (e.g., on a road context associated with the scenario), a first road segment associated with map data, or otherwise. The road context may be or may comprise one or more target road features and/or actions to perform. Operation 606 may comprise any of the examples discussed above in relation to operations 404-406 and/or 504.

Process 600 may comprise operation 608. Operation 608 may comprise determining, based at least in part on the dataset and the road segment, a driving metric associated with the road segment indicative of the relative probability of driving on the road segment. For example, as discussed above, the driving metric may be associated with the number of times a test vehicle (or vehicles) traversed the road segment, as represented in the data stored in the dataset.

Process 600 may comprise operation 610. Operation 610 may comprise initiating a first simulation of the vehicle in accordance with the driving simulation scenario, the first simulation including the first road segment. Operation 608 may further comprise initiating a second simulation of the vehicle in accordance with the driving simulation scenario, the second simulation including a second road segment, determined similarly to the first road segment. Operation 608 may comprise any of the examples discussed above in relation to operation 408.

Process 600 may comprise operation 612. Operation 612 may comprise determining a safety metric associated with performance of the simulated vehicle in the simulation. For example, the safety metric may be based on factors associated with the simulated vehicle, such as vehicle speed, and/or based on factors associated with other simulated objects, such as a minimum distance between the simulated vehicle and another object during the simulation.

Process 600 may comprise operation 614. Operation 610 may comprise, based at least in part on the metric associated with likelihood of occurrence of the driving scenario and on the driving metric, an aggregate safety metric indicative of performance of the simulated vehicle over all regions and all scenarios. For example, the metric and/or the driving metric may be applied as weights (e.g., multipliers) to the safety metric.

Process 600 may comprise operation 616. Operation 616 may comprise, based at least in part on the aggregate safety metric, transmitting a signal to a vehicle of a fleet of vehicles to be controlled autonomously. Operation 616 may be similar to operation 214 discussed above.

FIG. 7 illustrates an example process 700. Process 700 may be implemented on a system comprising one or more processors and one or more non-transitory computer-readable media storing instructions that, when executed, perform the operations of process 700. Process 700 may be implemented as one or more transitory or non-transitory computer-readable media storing instructions executable by one or more processors, wherein the instructions, when executed, cause the one or more processors to perform the operations of process 700. Process 700 may be implemented as a computer program comprising instructions which, when executed by a computer device, cause the computer device to perform the operations of process 700. Process 700 may be implemented on computer device(s) 832 described below in relation to FIG. 8.

Process 700 may comprise operation 702. Operation 702 may comprise receiving a driving simulation scenario associated with a simulated vehicle. In some examples the driving simulation scenario may be associated with abstracted information such as a road context, a scenario type, and/or agent information. Operation 702 may be similar to operation 602 above.

Process 700 may comprise operation 704. Operation 704 may comprise determining, based at least in part on the driving simulation scenario, a metric associated a likelihood of occurrence of the driving simulation scenario. For example, operation 704 may comprise generating, the metric based at least in part on a database of driving events associated with the driving simulation scenario (e.g., based on a subset of events in the database that are associated with the driving simulation scenario. Operation 704 may comprise any of the examples discussed above in relation to operations 204-208 and/or operations 304-306.

Process 700 may comprise operation 706. Operation 706 may comprise identifying a first road segment in map data. For example, operation 706 may comprise receiving map data comprising a first road segment associated with a first road context; and identifying the first road segment based at least in part on an association between the first road context and the target road context. Operation 606 may comprise any of the examples discussed above in relation to operations 404-406 and/or 504. In other examples, operation 706 may comprise identifying the first road segment from a predetermined list of road segments.

Process 700 may comprise operation 708. Operation 708 may comprise initiating a simulation comprising the simulated vehicle in accordance with the driving simulation scenario, the simulation including the first road segment. Operation 708 may be similar to operation 408 discussed above.

Process 700 may comprise operation 710. Operation 710 may comprise determining a metric indicative of performance of the vehicle based at least in part on the metric associated with likelihood of occurrence of a driving scenario, the relative probability of driving on the road segment, and the simulation. Operation 614 may be similar to operation 610 above.

Simulation Noise

As discussed above, simulations of driving scenarios may be performed to test how a vehicle responds to defined driving scenarios. Such simulations may primarily test the prediction and or planning components of a vehicle's control system (discussed further below). Rather than simulating raw sensor signals (e.g., lidar point clouds as would be generated by lidar system on a real vehicle), simulations may generate higher level observational data, for example as may be output by a perception component (also discussed below). Such data may for example label one or more objects/agents around the simulated vehicle, rather than raw measurements from such objects which may be computationally intensive to generate. In effect therefore, the simulated prediction and/or planning components of the simulated vehicle may be provided with ground truth observational data.

In the real world, random errors may occur when detecting the environment around a vehicle. For example, sensors of a vehicle (or the perception component interpreting sensor data) may identify an incorrect position, speed, yaw, pitch, size, category, or any other parameter, of an agent near the vehicle, at least for one tick (time unit) of sensor data. Sensors or the perception component may even fail to detect an object/agent for one or more ticks. As such errors in the real world can effect how the vehicle performs, it may be desired to also test the simulated vehicle against observation errors.

In some approaches, errors may be manually predetermined and applied to simulations of driving scenarios. However, such approaches may rely on a trigger condition occurring in the simulation, such as, in a non-limiting example, an object being detected by the simulated vehicle with at least 10% occlusion. However, it may not be possible to know in advance what conditions will actually occur in the simulation. Thus, predetermined errors may not actually be applied to a simulation, resulting in the vehicle not being tested against observational errors.

Accordingly, in some techniques of the present disclosure, simulations may be executed in which noise is applied to one or more parameters associated with a simulated agent or object. Noise may be applied by the computing system executing the simulation, such as driving simulation component 456. Noise may be applied on a tick-by-tick basis, for example without any dependence between the applied noise from one tick to the next for a given parameter. Noise may be considered to be a low level of uncertainty in the value of a parameter. Noise may be applied to a parameter as an uncertainty range, or a value of the parameter within a range of uncertainty may be selected and provided to the simulated vehicle control components. By applying noise in this manner, it may be assured that the simulated vehicle control components will be tested against some observational errors, increasing the robustness of the simulation results and allowing performance issues resulting from observational errors to be identified.

In some examples, the noise applied to a parameter may be determined based on a distribution based at least in part on the ground truth value of the parameter. For example, the distribution may comprise a Gaussian function or a Wiener function. Different models may be applied to different parameters, for example reflecting real world observations of error variation.

In some examples, the amount of noise applied to a parameter, e.g., at a particular tick in the simulation, may be based on a factor associated with the simulated environment at that tick. For example, the amount of noise may be based at least in part on one or more of: a distance between the simulated vehicle and the simulated agent, a classification of the agent (e.g., in a non-limiting example, the type of vehicle the agent is), how occluded the agent is as viewed from the simulated vehicle, and/or the speed of the vehicle.

Example Vehicle and Computing Device(s)

Figure 8:
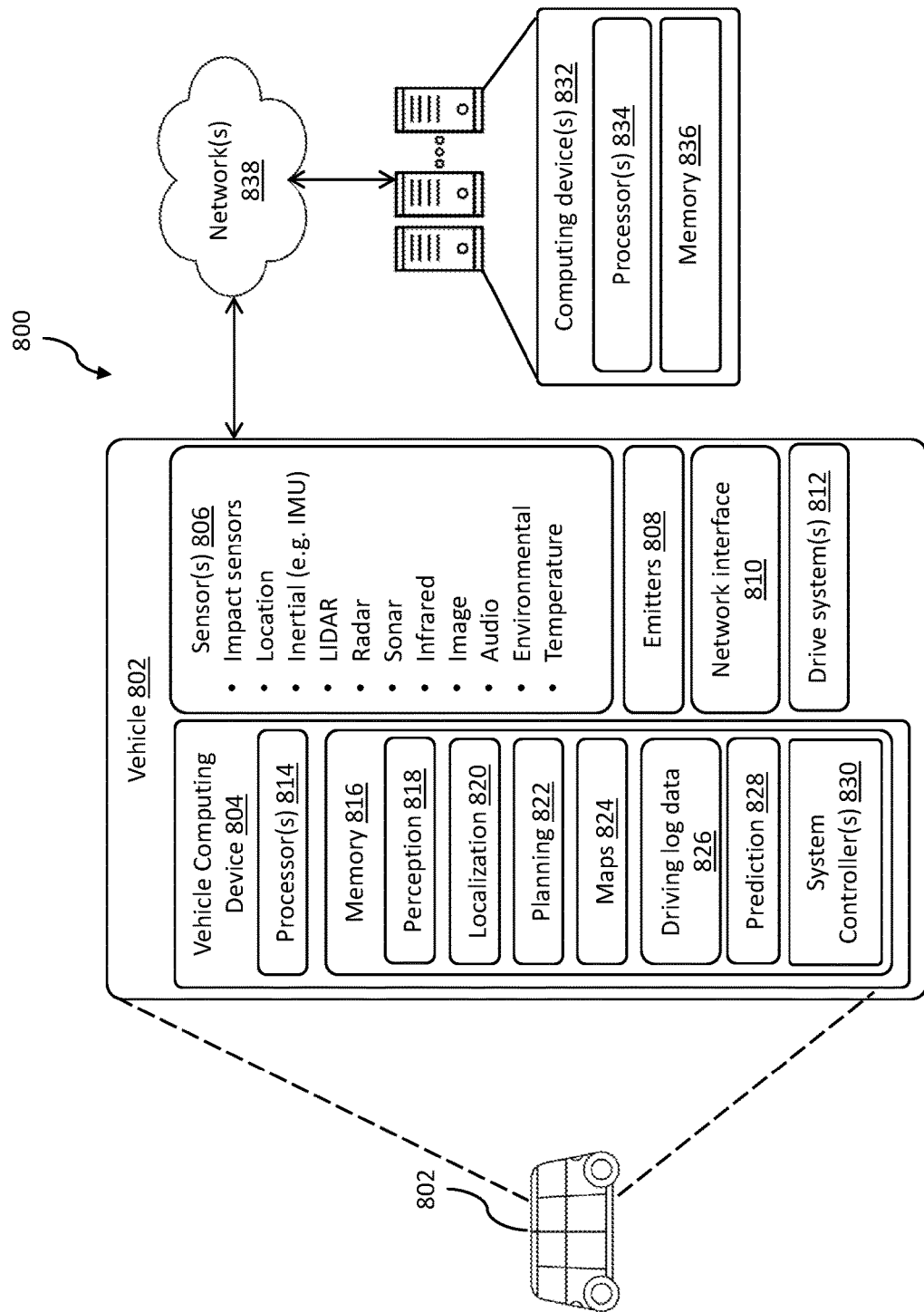
FIG. 8 is a block diagram illustrating an example vehicle system according to the present invention.

FIG. 8 illustrates a block diagram of an example system 800 that implements the techniques discussed herein. FIG. 8 may represent a real-world vehicle which may be simulated according to the techniques above. In some instances, the example system 800 may include a vehicle 802, which may represent the vehicle 102 in FIG. 1. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification. Moreover, in some instances, the techniques described herein may be usable by non-autonomous vehicles as well.

The vehicle 802 may include a vehicle computing device(s) 804, sensor(s) 806, emitter(s) 808, network interface(s) 810, and/or drive system(s) 812. The system 800 may additionally or alternatively comprise computing device(s) 832.

In some instances, the sensor(s) 806 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 806 may include multiple instances of each of these or other types of sensors. For instance, the radar sensors may include individual radar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device(s) 804 and/or to computing device(s) 832.

The vehicle 802 may also include emitter(s) 808 for emitting light and/or sound, as described above. The emitter(s) 808 may include interior audio and visual emitter(s) to communicate with passengers of the vehicle 802. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include network interface(s) 810 that enable communication between the vehicle 802 and one or more other local or remote computing device(s). The network interface(s) 810 may facilitate communication with other local computing device(s) on the vehicle 802 and/or the drive component(s) 812. The network interface(s) 810 may additionally or alternatively allow the vehicle to communicate with other nearby computing device(s) (e.g., other nearby vehicles, traffic signals, etc.). The network interface(s) 810 may additionally or alternatively enable the vehicle 802 to communicate with computing device(s) 832 over a network 838. In some examples, computing device(s) 832 may comprise one or more nodes of a distributed computing system (e.g., a cloud computing architecture).

The vehicle 802 may include one or more drive components 812. In some instances, the vehicle 802 may have a single drive component 812. In some instances, the drive component(s) 812 may include one or more sensors to detect conditions of the drive component(s) 812 and/or the surroundings of the vehicle 802. By way of example and not limitation, the sensor(s) of the drive component(s) 812 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 812. In some cases, the sensor(s) on the drive component(s) 812 may overlap or supplement corresponding systems of the vehicle 802 (e.g., sensor(s) 806).

The drive component(s) 812 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 812 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 812. Furthermore, the drive component(s) 812 may also include one or more communication connection(s) that enable communication by the respective drive component with one or more other local or remote computing device(s).

The vehicle computing device(s) 804 may include processor(s) 814 and memory 816 communicatively coupled with the one or more processors 814. Computing device(s) 832 may also include processor(s) 834, and/or memory 836. The processor(s) 814 and/or 834 may be any suitable processor capable of executing instructions to process data and perform operations as described herein. By way of example and not limitation, the processor(s) 814 and/or 834 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 816 and/or 836 may be examples of non-transitory computer-readable media. The memory 816 and/or 836 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 816 and/or memory 836 may store a perception component 818, localization component 820, planning component 822, map(s) 824, driving log data 826, prediction component 828, and/or system controller(s) 830—zero or more portions of any of which may be hardware, such as GPU(s), CPU(s), and/or other processing units.

The perception component 818 may detect object(s) in in an environment surrounding the vehicle 802 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 818 is referred to as perception data. The perception component 818 may be configured to associate a bounding region (or other indication) with an identified object. The perception component 818 may be configured to associate a confidence score associated with a classification of the identified object with an identified object. In some examples, objects, when rendered via a display, can be colored based on their perceived class. The object classifications determined by the perception component 818 may distinguish between different object types such as, for example, a passenger vehicle, a pedestrian, a bicyclist, motorist, a delivery truck, a semi-truck, traffic signage, and/or the like.

In at least one example, the localization component 820 may include hardware and/or software to receive data from the sensor(s) 806 to determine a position, velocity, and/or orientation of the vehicle 802 (e.g., one or more of an x-, y-, z-position, roll, pitch, or yaw). For example, the localization component 820 may include and/or request/receive map(s) 824 of an environment and can continuously determine a location, velocity, and/or orientation of the autonomous vehicle 802 within the map(s) 824. In some instances, the localization component 820 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 820 may provide data to various components of the vehicle 802 to determine an initial position of an autonomous vehicle for generating a trajectory and/or for generating map data, as discussed herein. In some examples, localization component 820 may provide, to the perception component 818, a location and/or orientation of the vehicle 802 relative to the environment and/or sensor data associated therewith.

The planning component 822 may receive a location and/or orientation of the vehicle 802 from the localization component 820 and/or perception data from the perception component 818 and may determine instructions for controlling operation of the vehicle 802 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 830 and/or drive component(s) 812 may parse/cause to be carried out, second instructions for the emitter(s) 808 may be formatted according to a second format associated therewith).

The driving log data 826 may comprise sensor data, perception data, and/or scenario labels collected/determined by the vehicle 802 (e.g., by the perception component 818), as well as any other message generated and or sent by the vehicle 802 during operation including, but not limited to, control messages, error messages, etc. In some examples, the vehicle 802 may transmit the driving log data 826 to the computing device(s) 832. The computing device(s) 832 may identify one or more scenarios based at least in part on the log data, which may also comprise defining a scenario, wherein the scenarios are used to generate a playback simulation. For example, the computing device(s) 832 may determine an environmental layout, a number, type, and a configuration of object(s) in the environment and/or associate this definition with one or more portions of log data associated with that scenario. In some examples, the driving log data 826 may comprise (historical) perception data that was generated on the vehicle 802 during operation of the vehicle.

The prediction component 828 may generate one or more probability maps representing prediction probabilities of possible locations of one or more objects in an environment. For example, the prediction component 828 may generate one or more probability maps for vehicles, pedestrians, animals, and the like within a threshold distance from the vehicle 802. In some examples, the prediction component 828 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 822 may be communicatively coupled to the prediction component 828 to generate predicted trajectories of objects in an environment. For example, the prediction component 828 may generate one or more predicted trajectories for objects within a threshold distance from the vehicle 802. In some examples, the prediction component 828 may measure a trace of an object and generate a trajectory for the object based on observed and predicted behavior. Although prediction component 828 is shown on a vehicle 802 in this example, the prediction component 828 may also be provided elsewhere, such as in a remote computing device. In some examples, a prediction component may be provided at both a vehicle and a remote computing device. These components may be configured to operate according to the same or a similar algorithm.

The memory 816 and/or 836 may additionally or alternatively store a mapping system, a planning system, a ride management system, etc. Although perception component 818 and/or planning component 822 are illustrated as being stored in memory 816, perception component 818 and/or planning component 822 may include processor-executable instructions, machine-learned model(s) (e.g., a neural network), and/or hardware.

As described herein, the localization component 820, the perception component 818, the planning component 822, and/or other components of the system 800 may comprise one or more ML models. For example, the localization component 820, the perception component 818, the planning component 822 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 820 may additionally or alternatively store one or more system controller(s) 830, which may be configured to control steering, propulsion, braking, safety, emitters, communication, and other systems of the vehicle 802. These system controller(s) 830 may communicate with and/or control corresponding systems of the drive component(s) 812 and/or other components of the vehicle 802.

It should be noted that while FIG. 8 is illustrated as a distributed system, in alternative examples, components of the vehicle 802 may be associated with the computing device(s) 832 and/or components of the computing device(s) 832 may be associated with the vehicle 802. That is, the vehicle 802 may perform one or more of the functions associated with the computing device(s) 832, and vice versa.

Figure 9:
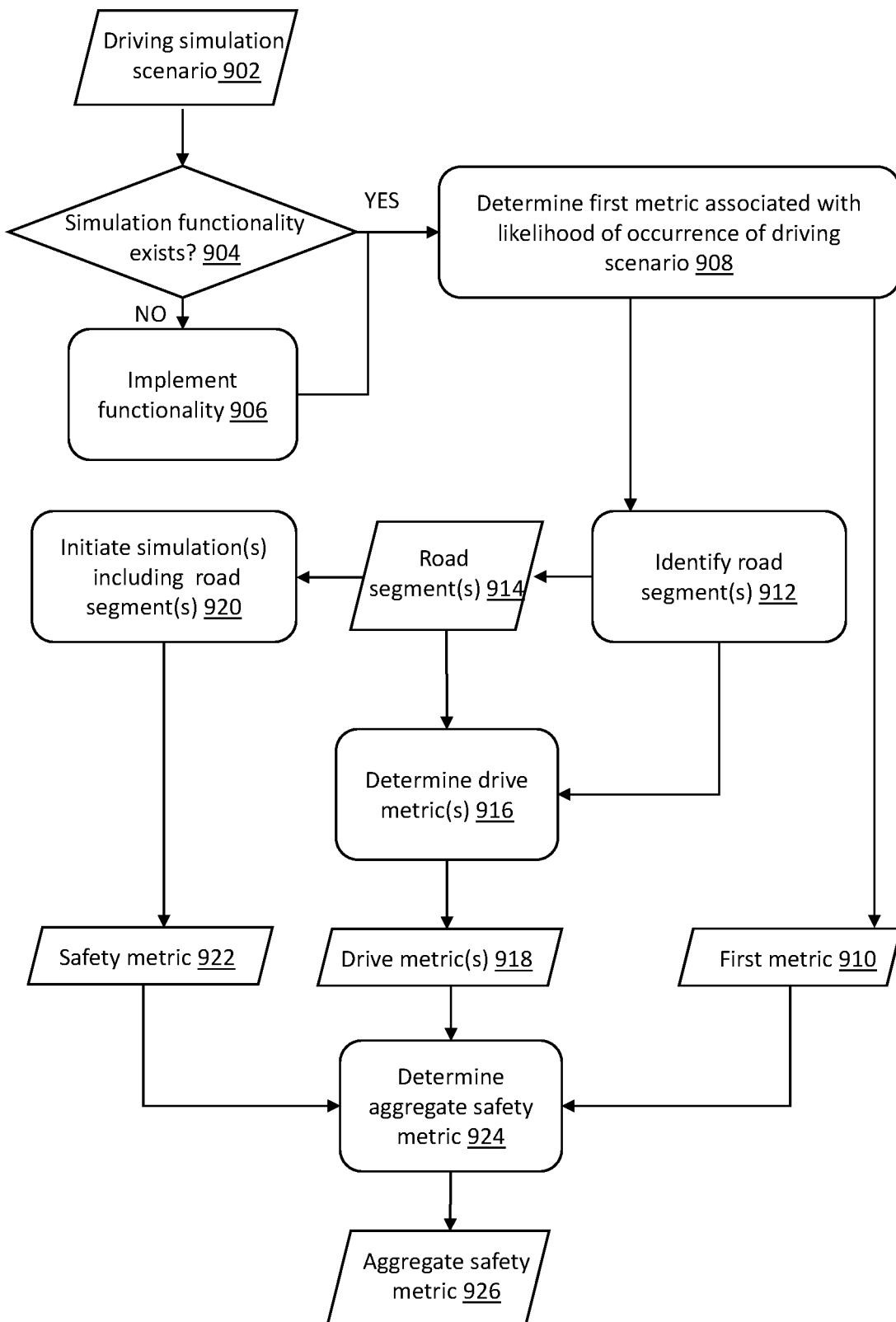
FIG. 9 illustrates process blocks of an example system for implementing one or more techniques of the present disclosure.

FIG. 9 provides a further illustration of the systems and techniques discussed above, for example in relation to FIGS. 7 and 8. FIG. 9 may be considered to represent a system architecture, for example representing computing modules, blocks, or operations implemented on one or more computing devices. For example, the system of FIG. 9 may be implemented on the computing device(s) 832 discussed above.

The system in FIG. 9 starts with a driving simulation scenario 902. Driving simulation scenario 902 may be defined by an operator, or may be computer-generated. Driving simulation scenario 902 may be a scenario as received in operations 202, 302, 402, 502, 602, or 702 above.

The driving simulation scenario 902 may be received by decision block 904. Decision block 904 may determine if the functionality exists to implement a simulation in accordance with the driving simulation scenario 902. For example, decision block 904 may determine if a simulation database comprises parameters for implementing the scenario; if a simulation database comprises agents capable of operating in a simulation as required by the scenario; and/or if default agents in a simulation database require modification (e.g., implanting behaviors) to be used in the simulation.

If decision block 904 determines that the functionality exists, the system may continue to block 908.

If decision block 904 determines that there is not the functionality, at block 906 the missing functionality may be implemented. For example, block 904 may comprise applying, based at least in part on the driving simulation scenario 902, a behavioral property to the default agent. After implementing such functionality, the system continues to block 908.

At block 908, a first metric may be determined, the first metric 910 associated with a likelihood of occurrence of the driving scenario. Block 908 may implement any of the techniques discussed in relation to operations 204-208, 304-306, 604, or 704 discussed above to determine the first metric 910. In some examples, multiple driving simulation scenarios 902 may be processed in accordance with decision block 904 and block 908, which may yield a respective first metric 910 for each driving simulation scenario.

The system may further comprise block 912, comprising identifying one or more road segments 914. Although illustrated as following block 908, block 912 may be performed before or concurrently with block 908. Block 912 may implement any of the techniques described above in relation to operations 404-406, 504, 606, or 706 discussed above. Where there are multiple driving simulation scenarios 902, respective sets of road segment(s) 914 may be determined for each driving simulation scenario 902.

The system may further comprise block 916, comprising determining a drive metric 918 (or respective drive metrics 918 for each road segment 914 determined by block 912). As discussed above, the drive metric(s) 918 may be indicative of a likelihood that the road segment(s) 914 will be driven on, for example as represented in log data. Block 912 may implement any of the techniques discussed in relation to operation 608 above.

The system may further comprise block 920, comprising initiating simulation(s) in accordance with the driving simulation scenario(s) 902, and including the road segment(s) 914. Based at least in part on the simulation(s), one or more safety metric(s) 922 may be determined. A safety metric 922 may be indicative of a safety performance of a simulated vehicle in a respective simulation. Block 920 may implement any of the techniques discussed in relation to operations 212, 310, 410, 508, 612, or 710 above.

The system may thus yield three separate metrics, each ultimately derived from the driving simulation scenario 902: the first metric 910, drive metric 918, and safety metric 922. The system may further comprise block 924, comprising determining an aggregated safety metric 926. For example, the aggregated safety metric 926 may be determined based at least in part on applying weights associated with the drive metric 918 and first metric 910 to the safety metric 922. The aggregated safety metric 926 may be based at least in part on metrics associated with a plurality of driving simulation scenarios 902, and/or a plurality of road segments 914 (including a plurality of road segments 914 for each of a plurality of driving simulation scenarios 902). As discussed in relation to the techniques above, a signal may be transmitted to one or more vehicles of a fleet of vehicles based at least in part on the aggregated safety metric 926 (e.g., based on a comparison of the aggregated safety metric 926 to a safety threshold).

Example Clauses

A: A system comprising, one or more processors; and one or more non-transitory computer-readable media storing instructions that, when executed, cause the system to perform operations comprising: receiving a driving simulation scenario associated with simulating a simulated vehicle; receiving map data comprising a first road segment associated with a first road feature and a second road segment associated with a second road feature; determining, based at least in part on the map data and the driving simulation scenario, a dataset of road segments comprising the first road segment; initiating a simulation of the simulated vehicle in accordance with the driving simulation scenario, the simulation including the first road segment; determining, based at least in part on the simulation, a metric indicative of performance of the simulated vehicle; and transmitting, based at in part on the metric, a signal to a vehicle in a fleet of vehicles to drive autonomously within a real-world environment.

B: The system of clause A, wherein: the driving simulation scenario further specifies a target road feature, and determining the database of road segments comprises: determining a first similarity metric between the target road feature and the first road feature meets or exceeds a threshold similarity; and determining a second similarity metric between the target road feature and the second road feature is less than the threshold similarity.

C: The system of clause A or clause B, wherein determining the dataset of road segments comprises determining a set of road segments within the map data in which the driving simulation scenario is capable of being performed.

D: The system of any of clauses A to C, wherein the dataset comprises a third road segment, the operations comprising: determining a similarity between the first road segment and the third road segment; and based at least in part on the similarity, excluding the third road segment.

E: The system of any of clauses A to D, the operations further comprising: determining, based at least in part on stored data, a number of instances associated with driving on the first road segment; determining a total number of times all road segments in the region were driven on; and determining, based at least in part on the number of instances and the total number, a weight to associate with the first road segment, wherein the metric is further based at least in part on the weight.

F: A method comprising: receiving a driving simulation scenario associated simulating a simulated vehicle; determining, based at least in part on map data and the driving simulation scenario, a road segment of the map data; initiating a simulation of the vehicle in accordance with the driving simulation scenario, the simulation including the road segment; determining, based at least in part on the simulation, a safety metric associated with autonomous operation of the simulated vehicle in a region comprising the road segment; and transmitting a signal to a vehicle of a fleet of vehicles in a real-world environment to one or more of drive or refrain from driving in the region based at least in part on the safety metric.

G: The method of clause F, wherein determining the road segment is based at least in part on one or more of: (i) a maneuver defined by the driving simulation scenario being able to be performed on the road segment; (ii) the road segment matching a target road feature specified by the driving simulation scenario; (iii) the first road feature comprising the target road feature; (iv) the first road feature including part of the target road feature; or (v) the first road feature having a parameter within a predetermined threshold of an associated parameter of the target road feature.

H: The method of clause F or clause G, comprising: receiving one or more of: updated map data or an updated driving simulation scenario; and identifying a second road segment based at least in part on the updated driving simulation.

I: The method of any of clauses F to H, comprising: receiving a set of excluded road segments associated with prohibitions on vehicle operation; and removing the set of excluded road segments from the map data.

J: The method of any of clauses F to I, wherein determining the road segment is based at least in part on a target road feature associated with the driving simulation scenario, and wherein the target road feature comprises one or more of: an intersection type, a number of lanes, a lane type, a length, a curvature, a slope, a traffic rule, or an object.

K: The method of any of clauses F to J, wherein the map data comprises: identifying an additional road segment based at least in part on the driving simulation scenario; determining a similarity metric between the road segment and the additional road segment; and excluding, from the simulation, the additional road segment based at least in part on the similarity metric meeting or exceeding a threshold similarity score.

L: The method of any of clauses F to K, comprising: identifying a weight associated with the first road segment, the weight associated with a number of instances associated with driving on the first road segment in stored data; and initiating the simulation based at least in part on the weight.

M: The method of clause L, wherein the safety metric is based at least in part on the weight.

N: The method of any of clauses F to M, wherein the driving simulation scenario is a first driving simulation scenario, the simulation is a first simulation, and wherein the method comprises: initiating a second simulation of the vehicle in accordance with a second driving simulation scenario; and determining the safety metric based at least in part on the first simulation and the second simulation.

O: One or more non-transitory computer-readable media storing instructions executable by one or more processors, wherein the instructions, when executed, cause the one or more processors to perform operations comprising: receiving a driving simulation scenario associated simulating a simulated vehicle; determining, based at least in part on map data and the driving simulation scenario, a road segment of the map data; initiating a simulation of the vehicle in accordance with the driving simulation scenario, the simulation including the road segment; determining, based at least in part on the simulation, a safety metric associated with autonomous operation of the simulated vehicle in a region comprising the road segment; and transmitting a signal to a vehicle of a fleet of vehicles in a real-world environment to one or more of drive or refrain from driving in the region based at least in part on the safety metric.

P: The one or more non-transitory computer-readable media of clause O, wherein the driving simulation scenario is associated with a target road feature, and wherein the operations comprise: determining the road segment based at least in part on an association between a road feature associated with the road segment and the target road feature.

Q: The one or more non-transitory computer-readable media of clause P, wherein the target road feature is specified in the driving simulation scenario.

R: The one or more non-transitory computer-readable media of any of clauses O to Q, the operations comprising: determining that a road set generation condition is met; and identifying the road segment based at least in part on the road set generation condition being met.

S: The one or more non-transitory computer-readable media of any of clauses O to R, the operations comprising: determining a first metric associated a likelihood of occurrence of the driving simulation scenario; and determining the safety metric based at least in part on the simulation and on the first metric.

T: The one or more non-transitory computer-readable media of clause S, the operations comprising: determining, based at least on a set of driving data, a likelihood of traversing the road segment, wherein the safety metric is further based at least in part on the road segment.

AA: A system comprising, one or more processors; and one or more non-transitory computer-readable media storing instructions that, when executed, cause the system to perform operations comprising: receiving a driving simulation scenario specifying: a maneuver for a simulated vehicle, a position of a simulated agent proximate the simulated vehicle, and a road context to be simulated; generating a database query based at least in part on the driving simulation scenario; retrieving from a database, based at least in part on the database query, a plurality of driving events associated with the driving simulation scenario; determining, based at least in part on the plurality of driving events, a metric associated with a likelihood of occurrence of the driving simulation scenario; initiating a simulation based at least in part on the driving simulation scenario; determining, based at least in part on the simulation and the metric, a safety metric; and transmitting, based at least in part on the safety metric meeting or exceeding a threshold safety value, a signal to a vehicle of a fleet of vehicles in a real-world environment, the signal configured to control the vehicle to one or more of drive or refrain from driving in a region of the real-world environment associated with the driving simulation scenario.

BB: The system of clause AA, wherein retrieving the plurality of driving events comprising: identifying a set of driving events in the database associated with the maneuver; and retrieving the plurality of driving events from the set of driving events based at least in part on similarity metrics between the driving events in the set of driving events and the driving simulation scenario.

CC: The system of clause AA or clause BB, wherein the safety metric comprises a first safety metric, the operations comprising: modifying a parameter associated with the driving simulation scenario to create an altered driving simulation scenario; determining, based at least in part on the altered driving simulation scenario, a modified metric; instantiating a second simulation based at least in part on the altered driving simulation scenario; and determining, based at least in part on the modified metric and the second simulation, a second safety metric, wherein transmitting the signal is further based at least in part on the second safety metric.

DD: The system of clause CC, wherein: the parameter comprises an object type comprising one or more of a car, a truck, a pedestrian, a motorcycle, or a bicycle; and determining the modified metric comprises scaling the metric by a scalar determined based at least in part on the object type.

EE: The system of any of clauses AA to DD, wherein the scenario type is associated with one or more of: continuous driving, entering a road, exiting a road, turning, approaching an intersection, traversing an intersection, picking up a passenger, or dropping off a passenger.

FF: A method comprising: receiving a driving simulation scenario associated with a simulated vehicle; determining, based at least in part on the driving simulation scenario and a dataset of recorded driving associated with operation of a test vehicle in an environment, a plurality of driving events present in the dataset; determining, based at least in part on the plurality of driving events, a first metric associated with a likelihood of occurrence of the driving simulation scenario; instantiating a simulation based at least in part on the driving simulation scenario; determining, based at least in part on the simulation, a safety metric indicative of the safe performance of the simulated vehicle in the simulation; determining, based at least in part on the safety metric and the first metric, an aggregate safety metric; and based at least in part on the aggregate safety metric, transmitting a signal to a vehicle of a fleet of vehicles to be controlled autonomously.

GG: The method of clause FF, wherein the dataset comprises abstracted representations of log data comprising one or more vehicle maneuvers over periods of time.

HH: The method of clause FF or clause GG, wherein determining the plurality of driving events comprises: determining a similarity metric between a first driving event in the dataset and the driving simulation scenario; and including the first driving event in the plurality of driving events based at least in part on the similarity metric meeting or exceeding a similarity threshold.

II: The method of any of clauses FF to HH, wherein: the driving simulation scenario is associated with a road context to be simulated, and the method comprises identifying the plurality of driving events based at least in part on the road context.

JJ: The method of any of clauses FF to II, wherein the driving simulation scenario specifies, as simulation information, one or more of: a vehicle mode, a position of the simulated vehicle, or a maneuver to be performed by the simulated vehicle, and wherein determining the plurality of driving events comprises determining a plurality of driving events associated with information similar to the simulation information.

KK: The method of any of clauses FF to JJ, wherein the driving simulation scenario specifies simulated agent information associated with simulated agents, and wherein the method comprises identifying the plurality of driving events based at least in part on the simulated agent information.

LL: The method of any of clauses FF to KK, comprising: determining, based at least in part on map data and the driving simulation scenario, a road segment of the map data; wherein the simulation includes the road segment.

MM: The method of any of clauses FF to LL, comprising updating the first metric based at least in part on one or more of: a change associated with the driving simulation scenario; a change associated with the dataset; a change associated with the environment; or a predetermined schedule.

NN: One or more non-transitory computer-readable media storing instructions executable by one or more processors, wherein the instructions, when executed, cause the one or more processors to perform operations comprising: receiving a driving simulation scenario associated with a simulated vehicle; determining, based at least in part on the driving simulation scenario and a dataset of recorded driving associated with operation of a test vehicle in an environment, a plurality of driving events present in the dataset; determining, based at least in part on the plurality of driving events, a first metric associated with a likelihood of occurrence of the driving simulation scenario; instantiating a simulation based at least in part on the driving simulation scenario; determining, based at least in part on the simulation, a safety metric indicative of the safe performance of the simulated vehicle in the simulation; determining, based at least in part on the safety metric and the first metric, an aggregate safety metric; and based at least in part on the aggregate safety metric, transmitting a signal to a vehicle of a fleet of vehicles to be controlled autonomously.

OO: The one or more non-transitory computer-readable media of clause NN, the operations comprising determining one or more statistical models representing parameters associated with the plurality of driving events.

PP: The one or more non-transitory computer-readable media of clause NN or clause OO, wherein the signal is configured to control the vehicle to one or more of drive or refrain from driving in a region of the real-world environment associated with the driving simulation scenario; or to one or more of allow the vehicle to perform a maneuver or prevent the vehicle from performing the maneuver, the maneuver associated with the driving simulation scenario.

QQ: The one or more non-transitory computer-readable media of any of clauses NN to PP, wherein the dataset comprises abstracted representations associated with the driving events in the dataset, the operations comprising: determining the plurality of driving events based at least in part on a similarity between abstracted information associated with the driving simulation scenario and the abstracted representations associated with the driving events.

RR: The one or more non-transitory computer-readable media of clause QQ, wherein the abstracted representations comprise one or more of: vehicle maneuvers associated with the test vehicle; agent maneuvers associated with agents in the environment proximate to the test vehicle; or a road context associated with the environment.

SS: The one or more non-transitory computer-readable media of any of clauses NN to RR, the operations comprising: identifying a scenario type associated with the driving simulation scenario; and determining the plurality of driving events based at least in part on the scenario type.

TT: The one or more non-transitory computer-readable media of clause SS, wherein the scenario type is associated with one or more of: continuous driving, entering a road, exiting a road, turning, approaching an intersection, traversing an intersection, picking up a passenger, or dropping off a passenger.

AAA: A system comprising, one or more processors; and one or more non-transitory computer-readable media storing instructions that, when executed, cause the system to perform operations comprising: receiving a driving simulation scenario associated with simulating a vehicle; determining a first metric associated with the driving simulation scenario based at least in part on a subset of driving events of a database similar to the driving simulation scenario, the first metric indicative of the probability the scenario occurs in a real-world environment; identifying, based at least in part on the driving simulation scenario and map data, a road segment; determining, based at least in part on the dataset and the road segment, a driving metric associated with the road segment indicative of the relative probability of driving on the road segment; initiating a simulation of a simulated vehicle in accordance with the driving simulation scenario, the simulation including the road segment; determining a safety metric associated with performance of the simulated vehicle in the simulation; determining, based at least in part on the first metric and the driving metric, an aggregate safety metric indicative of performance of the simulated vehicle over all regions and all scenarios; and based at least in part on the aggregate safety metric, transmitting a signal to a vehicle of a fleet of vehicles to be controlled autonomously.

BBB: The system of clause AAA, wherein identifying the road segment comprises determining a maneuver associated with the driving simulation scenario is capable of being performed on the road segment.

CCC: The system of clause AAA or clause BBB, wherein the driving simulation scenario is associated with one or more of: a target road feature, a road network layout, or a position of a simulated agent in relation to the road network layout.

DDD: The system of any of clauses AAA to CCC, the operations comprising: updating the first metric based at least in part on one or more of: a predetermined time schedule, an update to the database of driving events, an update to the driving simulation scenario, or an update to the map.

EEE: A method comprising: receiving a driving simulation scenario associated with a simulated vehicle; generating, based at least in part on the driving simulation scenario, a first metric associated with a likelihood of occurrence of the driving simulation scenario, the first metric generated based at least in part on a database of driving events associated with the driving simulation scenario; identifying a first road segment in map data; initiating a simulation comprising the simulated vehicle in accordance with the driving simulation scenario, the simulation including the first road segment; and determining a metric indicative of performance of the vehicle based at least in part on the first metric and the simulation.

FFF: The method of clause EEE, wherein the driving simulation scenario is associated with a simulated agent, the method comprising: identifying, based at least in part on the driving simulation scenario, simulated agent information comprising one or more of: a simulated agent position associated with the road context or a simulated agent maneuver associated with the road context; identifying, based at least in part on one or more of: a scenario type associated with the driving simulation scenario or the simulated agent information, a plurality of driving events from the database of driving events; and generating the first metric based at least in part on the plurality of driving events.

GGG: The method of clause EEE or clause FFF, comprising: modifying a parameter associated with the driving simulation scenario to create an altered driving simulation scenario; and determining, based at least in part on the altered driving simulation scenario and the first metric, a modified metric.

HHH: The method of clause GGG, comprising determining the modified metric based at least in part on modifying the first metric based at least in part on the parameter associated with the driving simulation scenario.

III: The method of any of clauses EEE to HHH, the operations comprising determining one or more statistical models representing parameters associated with the plurality of driving events.

JJJ: The method of any of clauses EEE to III, wherein the database of driving events comprises abstracted representations associated with the driving events in the dataset, and wherein the method comprises: determining a plurality of driving events from the database of driving events based at least in part on a similarity between abstracted information associated with the driving simulation scenario and the abstracted representations associated with the driving events; and generating the first metric based at least in part on the plurality of driving events.

KKK: The method of any of clauses EEE to JJJ, wherein the driving simulation scenario is associated with a simulated agent, and wherein the method comprises: receiving a default agent representation associated with the simulated agent; and applying, based at least in part on the driving simulation scenario, a behavioral property to the default agent representation.

LLL: The method of any of clauses EEE to KKK, comprising one or more of: updating, based at least in part on the metric indicative of performance, a vehicle control model associated with controlling a vehicle in the real-world; or based at least in part on the metric indicative of performance, transmitting a signal to a vehicle of a fleet of vehicles to be controlled autonomously.

MMM: One or more non-transitory computer-readable media storing instructions executable by one or more processors, wherein the instructions, when executed, cause the one or more processors to perform operations comprising: receiving a driving simulation scenario associated with a simulated vehicle; determining, based at least in part on the driving simulation scenario, a first metric associated with a likelihood of occurrence of the driving simulation scenario; determining, based at least in part on map data and the driving simulation scenario, a road segment initiating a simulation based at least in part on the driving simulation scenario, the simulation including the road segment; and determining a metric indicative of performance of the vehicle based at least in part on the first metric and the simulation.

NNN: The one or more non-transitory computer-readable media of clause MMM, the operations comprising determining the road segment based at least in part on one or more of: (i) a maneuver defined by the driving simulation scenario being able to be performed on the road segment; (ii) the road segment matching a target road feature specified by the driving simulation scenario; (iii) the first road feature comprising the target road feature; (iv) the first road feature including part of the target road feature; or (v) the first road feature having a parameter within a predetermined threshold of an associated parameter of the target road feature.

OOO: The one or more non-transitory computer-readable media of clause MMM or clause NNN, the operations comprising: identifying a weight associated with the first road segment, the weight associated with a number of instances associated with driving on the first road segment in stored data; wherein the metric indicative of performance is based at least in part on the weight.

PPP: The one or more non-transitory computer-readable media of any of clauses MMM to OOO, the operations comprising determining the road segment based at least in part on a road context associated with the driving simulation scenario, wherein the road context comprises or is associated with one or more of: a target road feature, a road network layout, or a position of a simulated agent in relation to the road network layout.

QQQ: The one or more non-transitory computer-readable media of clause PPP, wherein the target road feature comprises one or more of: an intersection type, a number of lanes, a lane type, a length, a curvature, a slope, a traffic rule, or an object.

RRR: The one or more non-transitory computer-readable media of any of clauses MMM to QQQ, the operations comprising: initiating the simulation based at least in part on the first metric.

SSS: The one or more non-transitory computer-readable media of any of clauses MMM to RRR, the operations comprising: updating a vehicle control model based at least in part on the metric indicative of performance; and transmitting the vehicle control model to a vehicle, the vehicle controlled based at least in part on the vehicle control model.

TTT: The one or more non-transitory computer-readable media of any of clauses MMM to SSS, wherein the metric indicative of performance is a safety metric.

While the example clauses described above are described with respect to one particular implementation, it should be understood that, in the context of this document, the content of the example clauses can also be implemented via a method, device, system, computer-readable medium, and/or another implementation. Additionally, any of examples A-TTT may be implemented alone or in combination with any other one or more of the examples A-TTT (including any embodiment of clauses A-T being combined with any embodiment of clauses AA-TT and/or AAA-TTT; any embodiment of clauses AA-TT being combined with any embodiment of clauses A-T and/or AAA-TTT; and any embodiment of clauses AAA-TTT being combined with any embodiment of clauses A-T and/or AA-TT).

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising,
one or more processors; and
one or more non-transitory computer-readable media storing instructions that, when executed, cause the system to perform operations comprising:
 receiving a driving simulation scenario specifying:
  a maneuver for a simulated vehicle,
  a position of a simulated agent proximate the simulated vehicle, and
  a road context to be simulated;
 generating a database query based at least in part on the driving simulation scenario;
 retrieving from a database, based at least in part on the database query, a plurality of driving events associated with the driving simulation scenario, comprising:
  identifying a set of driving events in the database associated with the maneuver; and retrieving the plurality of driving events from the set of driving events based at least in part on similarity metrics between the driving events in the set of driving events and the driving simulation scenario;

determining, based at least in part on the plurality of driving events, a metric associated with a likelihood of occurrence of the driving simulation scenario;

initiating a simulation based at least in part on the driving simulation scenario;

determining, based at least in part on the simulation and the metric, a safety metric; and transmitting, based at least in part on the safety metric meeting or exceeding a threshold safety value, a signal to a vehicle of a fleet of vehicles in a real-world environment, the signal configured to control the vehicle to one or more of drive or refrain from driving in a region of the real-world environment associated with the driving simulation scenario.

2. The system of claim 1, wherein the safety metric comprises a first safety metric, the operations comprising:

modifying a parameter associated with the driving simulation scenario to create an altered driving simulation scenario;

determining, based at least in part on the altered driving simulation scenario, a modified metric;

instantiating a second simulation based at least in part on the altered driving simulation scenario; and determining, based at least in part on the modified metric and the second simulation, a second safety metric, wherein transmitting the signal is further based at least in part on the second safety metric.

3. The system of claim 2, wherein:

the parameter comprises an object type comprising one or more of a car, a truck, a pedestrian, a motorcycle, or a bicycle; and determining the modified metric comprises scaling the metric by a scalar determined based at least in part on the object type.

4. The system of claim 1, wherein the operations comprise identifying a scenario type associated with the driving simulation scenario, the scenario type associated with one or more of: continuous driving, entering a road, exiting a road, turning, approaching an intersection, traversing an intersection, picking up a passenger, or dropping off a passenger.

5. A method comprising:

receiving a driving simulation scenario associated with a simulated vehicle;

determining, based at least in part on the driving simulation scenario and a dataset of recorded driving associated with operation of a test vehicle in an environment, a plurality of driving events present in the dataset, comprising:

determining the plurality of driving events based at least in part on similarity metrics between the driving events present in the dataset and the driving simulation scenario;

determining, based at least in part on the plurality of driving events, a first metric associated with a likelihood of occurrence of the driving simulation scenario;

instantiating a simulation based at least in part on the driving simulation scenario;

determining, based at least in part on the simulation, a safety metric indicative of the safe performance of the simulated vehicle in the simulation;

determining, based at least in part on the safety metric and the first metric, an aggregate safety metric; and based at least in part on the aggregate safety metric, transmitting a signal to a vehicle of a fleet of vehicles to be controlled autonomously.

6. The method of claim 5, wherein the dataset comprises abstracted representations of log data comprising one or more vehicle maneuvers over periods of time.

7. The method of claim 5, wherein determining the plurality of driving events comprises:

determining a similarity metric between a first driving event in the dataset and the driving simulation scenario; and including the first driving event in the plurality of driving events based at least in part on the similarity metric meeting or exceeding a similarity threshold.

8. The method of claim 5, wherein:

the driving simulation scenario is associated with a road context to be simulated, and the method comprises identifying the plurality of driving events based at least in part on the road context.

9. The method of claim 5, wherein the driving simulation scenario specifies, as simulation information, one or more of: a vehicle mode, a position of the simulated vehicle, or a maneuver to be performed by the simulated vehicle, and wherein determining the plurality of driving events comprises determining a plurality of driving events associated with information similar to the simulation information.

10. The method of claim 5, wherein the driving simulation scenario specifies simulated agent information associated with simulated agents, and wherein the method comprises identifying the plurality of driving events based at least in part on the simulated agent information.

11. The method of claim 5, comprising:

determining, based at least in part on map data and the driving simulation scenario, a road segment of the map data;

wherein the simulation includes the road segment.

12. The method of claim 5, comprising updating the first metric based at least in part on one or more of: a change associated with the driving simulation scenario; a change associated with the dataset; a change associated with the environment; or a predetermined schedule.

13. One or more non-transitory computer-readable media storing instructions executable by one or more processors, wherein the instructions, when executed, cause the one or more processors to perform operations comprising:

receiving a driving simulation scenario associated with a simulated vehicle;

determining, based at least in part on the driving simulation scenario and a dataset of recorded driving associated with operation of a test vehicle in an environment, a plurality of driving events present in the dataset, comprising:

determining the plurality of driving events based at least in part on similarity metrics between the driving events present in the dataset and the driving simulation scenario;

determining, based at least in part on the plurality of driving events, a first metric associated with a likelihood of occurrence of the driving simulation scenario;

instantiating a simulation based at least in part on the driving simulation scenario;

determining, based at least in part on the simulation, a safety metric indicative of the safe performance of the simulated vehicle in the simulation;

determining, based at least in part on the safety metric and the first metric, an aggregate safety metric; and based at least in part on the aggregate safety metric, transmitting a signal to a vehicle of a fleet of vehicles to be controlled autonomously.

14. The one or more non-transitory computer-readable media of claim 13, the operations comprising determining one or more statistical models representing parameters associated with the plurality of driving events.

15. The one or more non-transitory computer-readable media of claim 13, wherein the signal is configured to control the vehicle to one or more of drive or refrain from driving in a region of the real-world environment associated with the driving simulation scenario; or to one or more of allow the vehicle to perform a maneuver or prevent the vehicle from performing the maneuver, the maneuver associated with the driving simulation scenario.

16. The one or more non-transitory computer-readable media of claim 13, wherein the dataset comprises abstracted representations associated with the driving events in the dataset, the operations comprising:

determining the plurality of driving events based at least in part on a similarity between abstracted information associated with the driving simulation scenario and the abstracted representations associated with the driving events.

17. The one or more non-transitory computer-readable media of claim 16, wherein the abstracted representations comprise one or more of: vehicle maneuvers associated with the test vehicle; agent maneuvers associated with agents in the environment proximate to the test vehicle; or a road context associated with the environment.

18. The one or more non-transitory computer-readable media of claim 13, the operations comprising:

identifying a scenario type associated with the driving simulation scenario; and determining the plurality of driving events based at least in part on the scenario type.

19. The one or more non-transitory computer-readable media of claim 18, wherein the scenario type is associated with one or more of: continuous driving, entering a road, exiting a road, turning, approaching an intersection, traversing an intersection, picking up a passenger, or dropping off a passenger.

* * * * *